US012803895B2

(12) United States Patent
Ramaswamy et al.

(10) Patent No.: US 12,803,895 B2
(45) Date of Patent: Nov. 17, 2026

(54) METHOD FOR MODIFYING AN SD-WAN USING METRIC-BASED HEAT MAPS

(71) Applicant: VeloCloud Networks, LLC, Santa Clara, CA (US)

(72) Inventors: Navaneeth Krishnan Ramaswamy, Chennai (IN); Arun Kumar Srinivasan, Waterloo (CA)

(73) Assignee: VeloCloud Networks, LLC, Santa Clara, CA (US)

( * ) Notice: Subject to any disclaimer, the term of this patent is extended or adjusted under 35 U.S.C. 154(b) by 734 days.

(21) Appl. No.: 18/211,820

(22) Filed: Jun. 20, 2023

(65) Prior Publication Data

US 2024/0028378 A1 Jan. 25, 2024

(30) Foreign Application Priority Data

Jul. 20, 2022 (IN) ............................. 202241041528
Jul. 20, 2022 (IN) ............................. 202241041529
Jul. 20, 2022 (IN) ............................. 202241041530

(51) Int. Cl.
*H04L 45/02* (2022.01)
*G06F 9/455* (2018.01)
(Continued)

(52) U.S. Cl.
CPC .......... *H04L 45/02* (2013.01); *G06F 9/45558* (2013.01); *H04L 43/0876* (2013.01);
(Continued)

(58) Field of Classification Search
CPC ..... H04L 45/02; H04L 43/0876; H04L 47/24; H04L 67/10; G06F 9/45558; G06F 2009/4557
(Continued)

(56) References Cited

U.S. PATENT DOCUMENTS 5,652,751 A 7/1997 Sharony
5,909,553 A 6/1999 Campbell et al.
(Continued)

FOREIGN PATENT DOCUMENTS

CN 1926809 A 3/2007
CN 102577270 A 7/2012
(Continued)

OTHER PUBLICATIONS

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

(Continued)

*Primary Examiner* — Pierre Vital
*Assistant Examiner* — Jordan Scott Motter
(74) *Attorney, Agent, or Firm* — BainwoodHuang

(57) ABSTRACT

Some embodiments provide a method for using a heat map to modify an SD-WAN (software-defined wide-area network) deployed for a set of geographic locations. From a set of managed forwarding elements (MFEs) that forward multiple data message flows through the SD-WAN to a set of destination clusters, the method collects multiple metrics associated with the multiple data message flows. Based on the collected multiple metrics, the method generates a heat map that accounts for (1) the multiple data message flows, (2) locations of the set of MFEs, and (3) locations of the one or more destination clusters. The method uses the generated heat map to identify at least one modification to make to the SD-WAN to improve forwarding of the multiple data message flows.

20 Claims, 12 Drawing Sheets

(51) Int. Cl.
*H04L 43/0876* (2022.01)
*H04L 45/12* (2022.01)
*H04L 47/24* (2022.01)
*H04L 67/10* (2022.01)

(52) U.S. Cl.
CPC ............ *H04L 45/124* (2013.01); *H04L 47/24* (2013.01); *H04L 67/10* (2013.01); *G06F 2009/4557* (2013.01); *G06F 2009/45595* (2013.01)

(58) Field of Classification Search
USPC .............................................................. 718/1
See application file for complete search history.

(56) References Cited

U.S. PATENT DOCUMENTS

| | | | |
|---|---|---|---|
| 6,154,465 | A | 11/2000 | Pickett |
| 6,157,648 | A | 12/2000 | Voit et al. |
| 6,201,810 | B1 | 3/2001 | Masuda et al. |
| 6,363,378 | B1 | 3/2002 | Conklin et al. |
| 6,445,682 | B1 | 9/2002 | Weitz |
| 6,744,775 | B1 | 6/2004 | Beshai et al. |
| 6,976,087 | B1 | 12/2005 | Westfall et al. |
| 7,003,481 | B2 | 2/2006 | Banka et al. |
| 7,280,476 | B2 | 10/2007 | Anderson |
| 7,313,629 | B1 | 12/2007 | Nucci et al. |
| 7,320,017 | B1 | 1/2008 | Kurapati et al. |
| 7,373,660 | B1 | 5/2008 | Guichard et al. |
| 7,581,022 | B1 | 8/2009 | Griffin et al. |
| 7,680,925 | B2 | 3/2010 | Sathyanarayana et al. |
| 7,681,236 | B2 | 3/2010 | Tamura et al. |
| 7,751,409 | B1 | 7/2010 | Carolan |
| 7,962,458 | B2 | 6/2011 | Holenstein et al. |
| 8,094,575 | B1 | 1/2012 | Vadlakonda et al. |
| 8,094,659 | B1 | 1/2012 | Arad |
| 8,111,692 | B2 | 2/2012 | Ray |
| 8,141,156 | B1 | 3/2012 | Mao et al. |
| 8,224,971 | B1 | 7/2012 | Miller et al. |
| 8,228,928 | B2 | 7/2012 | Parandekar et al. |
| 8,243,589 | B1 | 8/2012 | Trost et al. |
| 8,259,566 | B2 | 9/2012 | Chen et al. |
| 8,274,891 | B2 | 9/2012 | Averi et al. |
| 8,301,749 | B1 | 10/2012 | Finklestein et al. |
| 8,385,227 | B1 | 2/2013 | Downey |
| 8,516,129 | B1 | 8/2013 | Skene |
| 8,566,452 | B1 | 10/2013 | Goodwin, III et al. |
| 8,588,066 | B2 | 11/2013 | Goel et al. |
| 8,630,291 | B2 | 1/2014 | Shaffer et al. |
| 8,661,295 | B1 | 2/2014 | Khanna et al. |
| 8,724,456 | B1 | 5/2014 | Hong et al. |
| 8,724,503 | B2 | 5/2014 | Johnsson et al. |
| 8,745,177 | B1 | 6/2014 | Kazerani et al. |
| 8,797,874 | B2 | 8/2014 | Yu et al. |
| 8,799,504 | B2 | 8/2014 | Capone et al. |
| 8,804,745 | B1 | 8/2014 | Sinn |
| 8,806,482 | B1 | 8/2014 | Nagargadde et al. |
| 8,855,071 | B1 | 10/2014 | Sankaran et al. |
| 8,856,339 | B2 | 10/2014 | Mestery et al. |
| 8,964,548 | B1 | 2/2015 | Keralapura et al. |
| 8,989,199 | B1 | 3/2015 | Sella et al. |
| 9,009,217 | B1 | 4/2015 | Nagargadde et al. |
| 9,015,299 | B1 | 4/2015 | Shah |
| 9,055,000 | B1 | 6/2015 | Ghosh et al. |
| 9,060,025 | B2 | 6/2015 | Xu |
| 9,071,607 | B2 | 6/2015 | Twitchell, Jr. |
| 9,075,771 | B1 | 7/2015 | Gawali et al. |
| 9,100,329 | B1 | 8/2015 | Jiang et al. |
| 9,135,037 | B1 | 9/2015 | Petrescu-Prahova et al. |
| 9,137,334 | B2 | 9/2015 | Zhou |
| 9,154,327 | B1 | 10/2015 | Marino et al. |
| 9,203,764 | B2 | 12/2015 | Shirazipour et al. |
| 9,225,591 | B2 | 12/2015 | Beheshti-Zavareh et al. |
| 9,306,949 | B1 | 4/2016 | Richard et al. |
| 9,323,561 | B2 | 4/2016 | Ayala et al. |
| 9,336,040 | B2 | 5/2016 | Dong et al. |
| 9,354,983 | B1 | 5/2016 | Yenamandra et al. |
| 9,356,943 | B1 | 5/2016 | Lopilato et al. |
| 9,379,981 | B1 | 6/2016 | Zhou et al. |
| 9,413,724 | B2 | 8/2016 | Xu |
| 9,419,878 | B2 | 8/2016 | Asiao et al. |
| 9,432,245 | B1 | 8/2016 | Sorenson, III et al. |
| 9,438,566 | B2 | 9/2016 | Zhang et al. |
| 9,450,817 | B1 | 9/2016 | Bahadur et al. |
| 9,450,852 | B1 | 9/2016 | Chen et al. |
| 9,462,010 | B1 | 10/2016 | Stevenson |
| 9,467,478 | B1 | 10/2016 | Khan et al. |
| 9,485,163 | B1 | 11/2016 | Fries et al. |
| 9,521,067 | B2 | 12/2016 | Michael et al. |
| 9,525,564 | B2 | 12/2016 | Lee |
| 9,542,219 | B1 | 1/2017 | Bryant et al. |
| 9,559,951 | B1 | 1/2017 | Sajassi et al. |
| 9,563,423 | B1 | 2/2017 | Pittman |
| 9,602,389 | B1 | 3/2017 | Maveli et al. |
| 9,608,917 | B1 | 3/2017 | Anderson et al. |
| 9,608,962 | B1 | 3/2017 | Chang |
| 9,614,748 | B1 | 4/2017 | Battersby et al. |
| 9,621,460 | B2 | 4/2017 | Mehta et al. |
| 9,641,551 | B1 | 5/2017 | Kariyanahalli |
| 9,648,547 | B1 | 5/2017 | Hart et al. |
| 9,665,432 | B2 | 5/2017 | Kruse et al. |
| 9,686,127 | B2 | 6/2017 | Ramachandran et al. |
| 9,692,714 | B1 | 6/2017 | Nair et al. |
| 9,715,401 | B2 | 7/2017 | Devine et al. |
| 9,717,021 | B2 | 7/2017 | Hughes et al. |
| 9,722,815 | B2 | 8/2017 | Mukundan et al. |
| 9,747,249 | B2 | 8/2017 | Cherian et al. |
| 9,755,965 | B1 | 9/2017 | Yadav et al. |
| 9,787,559 | B1 | 10/2017 | Schroeder |
| 9,807,004 | B2 | 10/2017 | Koley et al. |
| 9,819,540 | B1 | 11/2017 | Bahadur et al. |
| 9,819,565 | B2 | 11/2017 | Djukic et al. |
| 9,825,822 | B1 | 11/2017 | Holland |
| 9,825,911 | B1 | 11/2017 | Brandwine |
| 9,825,992 | B2 | 11/2017 | Xu |
| 9,832,128 | B1 | 11/2017 | Ashner et al. |
| 9,832,205 | B2 | 11/2017 | Santhi et al. |
| 9,875,355 | B1 | 1/2018 | Williams |
| 9,906,401 | B1 | 2/2018 | Rao |
| 9,923,826 | B2 | 3/2018 | Murgia |
| 9,930,011 | B1 | 3/2018 | Clemons, Jr. et al. |
| 9,935,829 | B1 | 4/2018 | Miller et al. |
| 9,942,787 | B1 | 4/2018 | Tillotson |
| 9,996,370 | B1 | 6/2018 | Khafizov et al. |
| 10,038,601 | B1 | 7/2018 | Becker et al. |
| 10,057,183 | B2 | 8/2018 | Salle et al. |
| 10,057,294 | B2 | 8/2018 | Xu |
| 10,116,593 | B1 | 10/2018 | Sinn et al. |
| 10,135,789 | B2 | 11/2018 | Mayya et al. |
| 10,142,226 | B1 | 11/2018 | Wu et al. |
| 10,178,032 | B1 | 1/2019 | Freitas |
| 10,178,037 | B2 | 1/2019 | Appleby et al. |
| 10,187,289 | B1 | 1/2019 | Chen et al. |
| 10,200,264 | B2 | 2/2019 | Menon et al. |
| 10,229,017 | B1 | 3/2019 | Zou et al. |
| 10,237,123 | B2 | 3/2019 | Dubey et al. |
| 10,250,498 | B1 | 4/2019 | Bales et al. |
| 10,263,832 | B1 | 4/2019 | Ghosh |
| 10,320,664 | B2 | 6/2019 | Nainar et al. |
| 10,320,691 | B1 | 6/2019 | Matthews et al. |
| 10,326,830 | B1 | 6/2019 | Singh |
| 10,348,767 | B1 | 7/2019 | Lee et al. |
| 10,355,989 | B1 | 7/2019 | Panchal et al. |
| 10,425,382 | B2 | 9/2019 | Mayya et al. |
| 10,454,708 | B2 | 10/2019 | Mibu |
| 10,454,714 | B2 | 10/2019 | Mayya et al. |
| 10,461,993 | B2 | 10/2019 | Turabi et al. |
| 10,498,652 | B2 | 12/2019 | Mayya et al. |
| 10,511,546 | B2 | 12/2019 | Singarayan et al. |
| 10,523,539 | B2 | 12/2019 | Mayya et al. |
| 10,550,093 | B2 | 2/2020 | Ojima et al. |
| 10,554,538 | B2 | 2/2020 | Spohn et al. |
| 10,560,431 | B1 | 2/2020 | Chen et al. |
| 10,565,464 | B2 | 2/2020 | Han et al. |

(56) References Cited

U.S. PATENT DOCUMENTS

| | | | |
|---|---|---|---|
| 10,567,519 | B1 | 2/2020 | Mukhopadhyaya et al. |
| 10,574,482 | B2 | 2/2020 | Oréet al. |
| 10,574,528 | B2 | 2/2020 | Mayya et al. |
| 10,594,516 | B2 | 3/2020 | Cidon et al. |
| 10,594,591 | B2 | 3/2020 | Houjyo et al. |
| 10,594,659 | B2 | 3/2020 | El-Moussa et al. |
| 10,608,844 | B2 | 3/2020 | Cidon et al. |
| 10,630,505 | B2 | 4/2020 | Rubenstein et al. |
| 10,637,889 | B2 | 4/2020 | Ermagan et al. |
| 10,666,460 | B2 | 5/2020 | Cidon et al. |
| 10,666,497 | B2 | 5/2020 | Tahhan et al. |
| 10,686,625 | B2 | 6/2020 | Cidon et al. |
| 10,693,739 | B1 | 6/2020 | Naseri et al. |
| 10,708,144 | B2 | 7/2020 | Mohan et al. |
| 10,715,427 | B2 | 7/2020 | Raj et al. |
| 10,749,711 | B2 | 8/2020 | Mukundan et al. |
| 10,778,466 | B2 | 9/2020 | Cidon et al. |
| 10,778,528 | B2 | 9/2020 | Mayya et al. |
| 10,778,557 | B2 | 9/2020 | Ganichev et al. |
| 10,805,114 | B2 | 10/2020 | Cidon et al. |
| 10,805,272 | B2 | 10/2020 | Mayya et al. |
| 10,819,564 | B2 | 10/2020 | Turabi et al. |
| 10,826,775 | B1 | 11/2020 | Moreno et al. |
| 10,841,131 | B2 | 11/2020 | Cidon et al. |
| 10,911,374 | B1 | 2/2021 | Kumar et al. |
| 10,938,693 | B2 | 3/2021 | Mayya et al. |
| 10,951,529 | B2 | 3/2021 | Puan et al. |
| 10,958,479 | B2 | 3/2021 | Cidon et al. |
| 10,959,098 | B2 | 3/2021 | Cidon et al. |
| 10,992,558 | B1 | 4/2021 | Silva et al. |
| 10,992,568 | B2 | 4/2021 | Michael et al. |
| 10,999,100 | B2 | 5/2021 | Cidon et al. |
| 10,999,137 | B2 | 5/2021 | Cidon et al. |
| 10,999,165 | B2 | 5/2021 | Cidon et al. |
| 10,999,197 | B2 | 5/2021 | Hooda et al. |
| 11,005,684 | B2 | 5/2021 | Cidon |
| 11,018,995 | B2 | 5/2021 | Cidon et al. |
| 11,044,190 | B2 | 6/2021 | Ramaswamy et al. |
| 11,050,588 | B2 | 6/2021 | Mayya et al. |
| 11,050,644 | B2 | 6/2021 | Hegde et al. |
| 11,071,005 | B2 | 7/2021 | Shen et al. |
| 11,089,111 | B2 | 8/2021 | Markuze et al. |
| 11,095,612 | B1 | 8/2021 | Oswal et al. |
| 11,102,032 | B2 | 8/2021 | Cidon et al. |
| 11,108,595 | B2 | 8/2021 | Knutsen et al. |
| 11,108,851 | B1 | 8/2021 | Kurmala et al. |
| 11,115,347 | B2 | 9/2021 | Gupta et al. |
| 11,115,426 | B1 | 9/2021 | Pazhyannur et al. |
| 11,115,480 | B2 | 9/2021 | Markuze et al. |
| 11,121,962 | B2 | 9/2021 | Michael et al. |
| 11,121,985 | B2 | 9/2021 | Cidon et al. |
| 11,128,492 | B2 | 9/2021 | Sethi et al. |
| 11,146,632 | B2 | 10/2021 | Rubenstein |
| 11,153,230 | B2 | 10/2021 | Cidon et al. |
| 11,171,885 | B2 | 11/2021 | Cidon et al. |
| 11,212,140 | B2 | 12/2021 | Mukundan et al. |
| 11,212,238 | B2 | 12/2021 | Cidon et al. |
| 11,223,514 | B2 | 1/2022 | Mayya et al. |
| 11,245,641 | B2 | 2/2022 | Ramaswamy et al. |
| 11,252,079 | B2 | 2/2022 | Michael et al. |
| 11,252,105 | B2 | 2/2022 | Cidon et al. |
| 11,252,106 | B2 | 2/2022 | Cidon et al. |
| 11,258,728 | B2 | 2/2022 | Cidon et al. |
| 11,310,170 | B2 | 4/2022 | Cidon et al. |
| 11,323,307 | B2 | 5/2022 | Mayya et al. |
| 11,349,722 | B2 | 5/2022 | Mayya et al. |
| 11,363,124 | B2 | 6/2022 | Markuze et al. |
| 11,374,904 | B2 | 6/2022 | Mayya et al. |
| 11,375,005 | B1 | 6/2022 | Rolando et al. |
| 11,381,474 | B1 | 7/2022 | Kumar et al. |
| 11,381,499 | B1 | 7/2022 | Ramaswamy et al. |
| 11,388,086 | B1 | 7/2022 | Ramaswamy et al. |
| 11,394,640 | B2 | 7/2022 | Ramaswamy et al. |
| 11,418,997 | B2 | 8/2022 | Devadoss et al. |
| 11,438,789 | B2 | 9/2022 | Devadoss et al. |
| 11,444,865 | B2 | 9/2022 | Ramaswamy et al. |
| 11,444,872 | B2 | 9/2022 | Mayya et al. |
| 11,477,127 | B2 | 10/2022 | Ramaswamy et al. |
| 11,489,720 | B1 | 11/2022 | Kempanna et al. |
| 11,489,783 | B2 | 11/2022 | Ramaswamy et al. |
| 11,509,571 | B1 | 11/2022 | Ramaswamy et al. |
| 11,516,049 | B2 | 11/2022 | Cidon et al. |
| 11,522,780 | B1 | 12/2022 | Wallace et al. |
| 11,526,434 | B1 | 12/2022 | Brooker et al. |
| 11,533,248 | B2 | 12/2022 | Mayya et al. |
| 11,552,874 | B1 | 1/2023 | Pragada et al. |
| 11,575,591 | B2 | 2/2023 | Ramaswamy et al. |
| 11,575,600 | B2 | 2/2023 | Markuze et al. |
| 11,582,144 | B2 | 2/2023 | Ramaswamy et al. |
| 11,582,298 | B2 | 2/2023 | Hood et al. |
| 11,601,356 | B2 | 3/2023 | Gandhi et al. |
| 11,606,225 | B2 | 3/2023 | Cidon et al. |
| 11,606,286 | B2 | 3/2023 | Michael et al. |
| 11,606,314 | B2 | 3/2023 | Cidon et al. |
| 11,606,712 | B2 | 3/2023 | Devadoss et al. |
| 11,611,507 | B2 | 3/2023 | Ramaswamy et al. |
| 11,637,768 | B2 | 4/2023 | Ramaswamy et al. |
| 11,677,720 | B2 | 6/2023 | Mayya et al. |
| 11,689,959 | B2 | 6/2023 | Devadoss et al. |
| 11,700,196 | B2 | 7/2023 | Michael et al. |
| 11,706,126 | B2 | 7/2023 | Silva et al. |
| 11,706,127 | B2 | 7/2023 | Michael et al. |
| 11,709,710 | B2 | 7/2023 | Markuze et al. |
| 11,716,286 | B2 | 8/2023 | Ramaswamy et al. |
| 11,722,925 | B2 | 8/2023 | Devadoss et al. |
| 11,729,065 | B2 | 8/2023 | Ramaswamy et al. |
| 2002/0049687 | A1 | 4/2002 | Helsper et al. |
| 2002/0075542 | A1 | 6/2002 | Kumar et al. |
| 2002/0085488 | A1 | 7/2002 | Kobayashi |
| 2002/0087716 | A1 | 7/2002 | Mustafa |
| 2002/0152306 | A1 | 10/2002 | Tuck |
| 2002/0186682 | A1 | 12/2002 | Kawano et al. |
| 2002/0198840 | A1 | 12/2002 | Banka et al. |
| 2003/0050061 | A1 | 3/2003 | Wu et al. |
| 2003/0061269 | A1 | 3/2003 | Hathaway et al. |
| 2003/0088697 | A1 | 5/2003 | Matsuhira |
| 2003/0112766 | A1 | 6/2003 | Riedel et al. |
| 2003/0112808 | A1 | 6/2003 | Solomon |
| 2003/0126468 | A1 | 7/2003 | Markham |
| 2003/0161313 | A1 | 8/2003 | Jinmei et al. |
| 2003/0189919 | A1 | 10/2003 | Gupta et al. |
| 2003/0202506 | A1 | 10/2003 | Perkins et al. |
| 2003/0219030 | A1 | 11/2003 | Gubbi |
| 2004/0059831 | A1 | 3/2004 | Chu et al. |
| 2004/0068668 | A1 | 4/2004 | Lor et al. |
| 2004/0165601 | A1 | 8/2004 | Liu et al. |
| 2004/0224771 | A1 | 11/2004 | Chen et al. |
| 2005/0078690 | A1 | 4/2005 | DeLangis |
| 2005/0149604 | A1 | 7/2005 | Navada |
| 2005/0154790 | A1 | 7/2005 | Nagata et al. |
| 2005/0172161 | A1 | 8/2005 | Cruz et al. |
| 2005/0195754 | A1 | 9/2005 | Nosella |
| 2005/0210479 | A1 | 9/2005 | Andjelic |
| 2005/0265255 | A1 | 12/2005 | Kodialam et al. |
| 2006/0002291 | A1 | 1/2006 | Alicherry et al. |
| 2006/0034335 | A1 | 2/2006 | Karaoguz et al. |
| 2006/0114838 | A1 | 6/2006 | Mandavilli et al. |
| 2006/0171365 | A1 | 8/2006 | Borella |
| 2006/0182034 | A1 | 8/2006 | Klinker et al. |
| 2006/0182035 | A1 | 8/2006 | Vasseur |
| 2006/0193247 | A1 | 8/2006 | Naseh et al. |
| 2006/0193252 | A1 | 8/2006 | Naseh et al. |
| 2006/0195605 | A1 | 8/2006 | Sundarrajan et al. |
| 2006/0245414 | A1 | 11/2006 | Susai et al. |
| 2007/0050594 | A1 | 3/2007 | Augsburg et al. |
| 2007/0064604 | A1 | 3/2007 | Chen et al. |
| 2007/0064702 | A1 | 3/2007 | Bates et al. |
| 2007/0083727 | A1 | 4/2007 | Johnston et al. |
| 2007/0091794 | A1 | 4/2007 | Filsfils et al. |
| 2007/0103548 | A1 | 5/2007 | Carter |
| 2007/0115812 | A1 | 5/2007 | Hughes |
| 2007/0121486 | A1 | 5/2007 | Guichard et al. |
| 2007/0130325 | A1 | 6/2007 | Lesser |
| 2007/0162619 | A1 | 7/2007 | Aloni et al. |

(56) References Cited

U.S. PATENT DOCUMENTS

| | | | |
|---|---|---|---|
| 2007/0162639 | A1 | 7/2007 | Chu et al. |
| 2007/0177511 | A1 | 8/2007 | Das et al. |
| 2007/0195797 | A1 | 8/2007 | Patel et al. |
| 2007/0237081 | A1 | 10/2007 | Kodialam et al. |
| 2007/0260746 | A1 | 11/2007 | Mirtorabi et al. |
| 2007/0268882 | A1 | 11/2007 | Breslau et al. |
| 2008/0002670 | A1 | 1/2008 | Bugenhagen et al. |
| 2008/0049621 | A1 | 2/2008 | McGuire et al. |
| 2008/0055241 | A1 | 3/2008 | Goldenberg et al. |
| 2008/0080509 | A1 | 4/2008 | Khanna et al. |
| 2008/0095187 | A1 | 4/2008 | Jung et al. |
| 2008/0117930 | A1 | 5/2008 | Chakareski et al. |
| 2008/0144532 | A1 | 6/2008 | Chamarajanagar et al. |
| 2008/0168086 | A1 | 7/2008 | Miller et al. |
| 2008/0175150 | A1 | 7/2008 | Bolt et al. |
| 2008/0181116 | A1 | 7/2008 | Kavanaugh et al. |
| 2008/0219276 | A1 | 9/2008 | Shah |
| 2008/0240121 | A1 | 10/2008 | Xiong et al. |
| 2008/0263218 | A1 | 10/2008 | Beerends et al. |
| 2009/0013210 | A1 | 1/2009 | McIntosh et al. |
| 2009/0028092 | A1 | 1/2009 | Rothschild |
| 2009/0125617 | A1 | 5/2009 | Klessig et al. |
| 2009/0141642 | A1 | 6/2009 | Sun |
| 2009/0154463 | A1 | 6/2009 | Hines et al. |
| 2009/0182874 | A1 | 7/2009 | Morford et al. |
| 2009/0247204 | A1 | 10/2009 | Sennett et al. |
| 2009/0268605 | A1 | 10/2009 | Campbell et al. |
| 2009/0274045 | A1 | 11/2009 | Meier et al. |
| 2009/0276657 | A1 | 11/2009 | Wetmore et al. |
| 2009/0303880 | A1 | 12/2009 | Maltz et al. |
| 2010/0008361 | A1 | 1/2010 | Guichard et al. |
| 2010/0017802 | A1 | 1/2010 | Lojewski |
| 2010/0046532 | A1 | 2/2010 | Okita |
| 2010/0061379 | A1 | 3/2010 | Parandekar et al. |
| 2010/0080129 | A1 | 4/2010 | Strahan et al. |
| 2010/0088440 | A1 | 4/2010 | Banks et al. |
| 2010/0091782 | A1 | 4/2010 | Hiscock |
| 2010/0091823 | A1 | 4/2010 | Retana et al. |
| 2010/0107162 | A1 | 4/2010 | Edwards et al. |
| 2010/0118727 | A1 | 5/2010 | Draves et al. |
| 2010/0118886 | A1 | 5/2010 | Saavedra |
| 2010/0128600 | A1 | 5/2010 | Srinivasmurthy et al. |
| 2010/0165985 | A1 | 7/2010 | Sharma et al. |
| 2010/0191884 | A1 | 7/2010 | Holenstein et al. |
| 2010/0223621 | A1 | 9/2010 | Joshi et al. |
| 2010/0226246 | A1 | 9/2010 | Proulx |
| 2010/0290422 | A1 | 11/2010 | Haigh et al. |
| 2010/0309841 | A1 | 12/2010 | Conte |
| 2010/0309912 | A1 | 12/2010 | Mehta et al. |
| 2010/0322255 | A1 | 12/2010 | Hao et al. |
| 2010/0332657 | A1 | 12/2010 | Elyashev et al. |
| 2011/0001604 | A1 | 1/2011 | Ludlow et al. |
| 2011/0007752 | A1 | 1/2011 | Silva et al. |
| 2011/0032939 | A1 | 2/2011 | Nozaki et al. |
| 2011/0035187 | A1 | 2/2011 | DeJori et al. |
| 2011/0040814 | A1 | 2/2011 | Higgins |
| 2011/0075674 | A1 | 3/2011 | Li et al. |
| 2011/0078783 | A1 | 3/2011 | Duan et al. |
| 2011/0107139 | A1 | 5/2011 | Middlecamp et al. |
| 2011/0110370 | A1 | 5/2011 | Moreno et al. |
| 2011/0141877 | A1 | 6/2011 | Xu et al. |
| 2011/0142041 | A1 | 6/2011 | Imai |
| 2011/0153909 | A1 | 6/2011 | Dong |
| 2011/0235509 | A1 | 9/2011 | Szymanski |
| 2011/0255397 | A1 | 10/2011 | Kadakia et al. |
| 2011/0302663 | A1 | 12/2011 | Prodan et al. |
| 2012/0008630 | A1 | 1/2012 | Ould-Brahim |
| 2012/0027013 | A1 | 2/2012 | Napierala |
| 2012/0039309 | A1 | 2/2012 | Evans et al. |
| 2012/0099601 | A1 | 4/2012 | Haddad et al. |
| 2012/0136697 | A1 | 5/2012 | Peles et al. |
| 2012/0140935 | A1 | 6/2012 | Kruglick |
| 2012/0157068 | A1 | 6/2012 | Eichen et al. |
| 2012/0173694 | A1 | 7/2012 | Yan et al. |
| 2012/0173919 | A1 | 7/2012 | Patel et al. |
| 2012/0182940 | A1 | 7/2012 | Taleb et al. |
| 2012/0221955 | A1 | 8/2012 | Raleigh et al. |
| 2012/0227093 | A1 | 9/2012 | Shatzkamer et al. |
| 2012/0240185 | A1 | 9/2012 | Kapoor et al. |
| 2012/0250682 | A1 | 10/2012 | Vincent et al. |
| 2012/0250686 | A1 | 10/2012 | Vincent et al. |
| 2012/0266026 | A1 | 10/2012 | Chikkalingaiah et al. |
| 2012/0281706 | A1 | 11/2012 | Agarwal et al. |
| 2012/0287818 | A1 | 11/2012 | Corti et al. |
| 2012/0300615 | A1 | 11/2012 | Kempf et al. |
| 2012/0307659 | A1 | 12/2012 | Yamada |
| 2012/0317270 | A1 | 12/2012 | Vrbaski et al. |
| 2012/0317291 | A1 | 12/2012 | Wolfe |
| 2013/0007505 | A1 | 1/2013 | Spear |
| 2013/0019005 | A1 | 1/2013 | Hui et al. |
| 2013/0021968 | A1 | 1/2013 | Reznik et al. |
| 2013/0044764 | A1 | 2/2013 | Casado et al. |
| 2013/0051237 | A1 | 2/2013 | Ong |
| 2013/0051399 | A1 | 2/2013 | Zhang et al. |
| 2013/0054763 | A1 | 2/2013 | Merwe et al. |
| 2013/0086267 | A1 | 4/2013 | Gelenbe et al. |
| 2013/0097304 | A1 | 4/2013 | Asthana et al. |
| 2013/0103729 | A1 | 4/2013 | Cooney et al. |
| 2013/0103834 | A1 | 4/2013 | Dzerve et al. |
| 2013/0117530 | A1 | 5/2013 | Kim et al. |
| 2013/0124718 | A1 | 5/2013 | Griffith et al. |
| 2013/0124911 | A1 | 5/2013 | Griffith et al. |
| 2013/0124912 | A1 | 5/2013 | Griffith et al. |
| 2013/0128889 | A1 | 5/2013 | Mathur et al. |
| 2013/0142201 | A1 | 6/2013 | Kim et al. |
| 2013/0170354 | A1 | 7/2013 | Takashima et al. |
| 2013/0173768 | A1 | 7/2013 | Kundu et al. |
| 2013/0173788 | A1 | 7/2013 | Song |
| 2013/0182712 | A1 | 7/2013 | Aguayo et al. |
| 2013/0185446 | A1 | 7/2013 | Zeng et al. |
| 2013/0185729 | A1 | 7/2013 | Vasic et al. |
| 2013/0191688 | A1 | 7/2013 | Agarwal et al. |
| 2013/0223226 | A1 | 8/2013 | Narayanan et al. |
| 2013/0223454 | A1 | 8/2013 | Dunbar et al. |
| 2013/0235870 | A1 | 9/2013 | Tripathi et al. |
| 2013/0238782 | A1 | 9/2013 | Zhao et al. |
| 2013/0242718 | A1 | 9/2013 | Zhang |
| 2013/0254599 | A1 | 9/2013 | Katkar et al. |
| 2013/0258839 | A1 | 10/2013 | Wang et al. |
| 2013/0258847 | A1 | 10/2013 | Zhang et al. |
| 2013/0266015 | A1 | 10/2013 | Qu et al. |
| 2013/0266019 | A1 | 10/2013 | Qu et al. |
| 2013/0283364 | A1 | 10/2013 | Chang et al. |
| 2013/0286846 | A1 | 10/2013 | Atlas et al. |
| 2013/0297611 | A1 | 11/2013 | Moritz et al. |
| 2013/0297770 | A1 | 11/2013 | Zhang |
| 2013/0301469 | A1 | 11/2013 | Suga |
| 2013/0301642 | A1 | 11/2013 | Radhakrishnan et al. |
| 2013/0308444 | A1 | 11/2013 | Sem-Jacobsen et al. |
| 2013/0315242 | A1 | 11/2013 | Wang et al. |
| 2013/0315243 | A1 | 11/2013 | Huang et al. |
| 2013/0329548 | A1 | 12/2013 | Nakil et al. |
| 2013/0329601 | A1 | 12/2013 | Yin et al. |
| 2013/0329734 | A1 | 12/2013 | Chesla et al. |
| 2013/0346470 | A1 | 12/2013 | Obstfeld et al. |
| 2014/0016464 | A1 | 1/2014 | Shirazipour et al. |
| 2014/0019604 | A1 | 1/2014 | Twitchell, Jr. |
| 2014/0019750 | A1 | 1/2014 | Dodgson et al. |
| 2014/0040975 | A1 | 2/2014 | Raleigh et al. |
| 2014/0064283 | A1 | 3/2014 | Balus et al. |
| 2014/0071832 | A1 | 3/2014 | Johnsson et al. |
| 2014/0092907 | A1 | 4/2014 | Sridhar et al. |
| 2014/0108665 | A1 | 4/2014 | Arora et al. |
| 2014/0112171 | A1 | 4/2014 | Pasdar |
| 2014/0115584 | A1 | 4/2014 | Mudigonda et al. |
| 2014/0122559 | A1 | 5/2014 | Branson et al. |
| 2014/0123135 | A1 | 5/2014 | Huang et al. |
| 2014/0126418 | A1 | 5/2014 | Brendel et al. |
| 2014/0156818 | A1 | 6/2014 | Hunt |
| 2014/0156823 | A1 | 6/2014 | Liu et al. |
| 2014/0157363 | A1 | 6/2014 | Banerjee |
| 2014/0160935 | A1 | 6/2014 | Zecharia et al. |
| 2014/0164560 | A1 | 6/2014 | Ko et al. |
| 2014/0164617 | A1 | 6/2014 | Jalan et al. |

(56) References Cited

U.S. PATENT DOCUMENTS

2014/0164718 A1 6/2014 Schaik et al.
2014/0173113 A1 6/2014 Vemuri et al.
2014/0173331 A1 6/2014 Martin et al.
2014/0181824 A1 6/2014 Saund et al.
2014/0189074 A1 7/2014 Parker
2014/0201642 A1 7/2014 Vicat-Blanc
2014/0208317 A1 7/2014 Nakagawa
2014/0219135 A1 8/2014 Li et al.
2014/0223507 A1 8/2014 Xu
2014/0229210 A1 8/2014 Sharifian et al.
2014/0244851 A1 8/2014 Lee
2014/0258535 A1 9/2014 Zhang
2014/0269690 A1 9/2014 Tu
2014/0279862 A1 9/2014 Dietz et al.
2014/0280499 A1 9/2014 Basavaiah et al.
2014/0310282 A1 10/2014 Sprague et al.
2014/0317440 A1 10/2014 Biermayr et al.
2014/0321277 A1 10/2014 Lynn, Jr. et al.
2014/0337500 A1 11/2014 Lee
2014/0337674 A1 11/2014 Ivancic et al.
2014/0341109 A1 11/2014 Cartmell et al.
2014/0355441 A1 12/2014 Jain
2014/0365834 A1 12/2014 Stone et al.
2014/0372582 A1 12/2014 Ghanwani et al.
2015/0003240 A1 1/2015 Drwiega et al.
2015/0016249 A1 1/2015 Mukundan et al.
2015/0029864 A1 1/2015 Raileanu et al.
2015/0039744 A1 2/2015 Niazi et al.
2015/0046572 A1 2/2015 Cheng et al.
2015/0052247 A1 2/2015 Threefoot et al.
2015/0052517 A1 2/2015 Raghu et al.
2015/0056960 A1 2/2015 Egner et al.
2015/0058917 A1 2/2015 Xu
2015/0088942 A1 3/2015 Shah
2015/0089628 A1 3/2015 Lang
2015/0092603 A1 4/2015 Aguayo et al.
2015/0096011 A1 4/2015 Watt
2015/0100958 A1 4/2015 Banavalikar et al.
2015/0106809 A1 4/2015 Reddy et al.
2015/0124603 A1 5/2015 Ketheesan et al.
2015/0134777 A1 5/2015 Onoue
2015/0139238 A1 5/2015 Pourzandi et al.
2015/0146539 A1 5/2015 Mehta et al.
2015/0163152 A1 6/2015 Li
2015/0169340 A1 6/2015 Haddad et al.
2015/0172121 A1 6/2015 Farkas et al.
2015/0172169 A1 6/2015 DeCusatis et al.
2015/0188823 A1 7/2015 Williams et al.
2015/0189009 A1 7/2015 Bemmel
2015/0195178 A1 7/2015 Bhattacharya et al.
2015/0201036 A1 7/2015 Nishiki et al.
2015/0222543 A1 8/2015 Song
2015/0222638 A1 8/2015 Morley
2015/0236945 A1 8/2015 Michael et al.
2015/0236962 A1 8/2015 Veres et al.
2015/0244617 A1 8/2015 Nakil et al.
2015/0249644 A1 9/2015 Xu
2015/0257081 A1 9/2015 Ramanujan et al.
2015/0264055 A1 9/2015 Budhani et al.
2015/0271056 A1 9/2015 Chunduri et al.
2015/0271104 A1 9/2015 Chikkamath et al.
2015/0271303 A1 9/2015 Neginhal et al.
2015/0281004 A1 10/2015 Kakadia et al.
2015/0312142 A1 10/2015 Barabash et al.
2015/0312760 A1 10/2015 O'Toole
2015/0317169 A1 11/2015 Sinha et al.
2015/0326426 A1 11/2015 Luo et al.
2015/0334025 A1 11/2015 Rader
2015/0334696 A1 11/2015 Gu et al.
2015/0341271 A1 11/2015 Gomez
2015/0349978 A1 12/2015 Wu et al.
2015/0350907 A1 12/2015 Timariu et al.
2015/0358232 A1 12/2015 Chen et al.
2015/0358236 A1 12/2015 Roach et al.
2015/0363221 A1 12/2015 Terayama et al.
2015/0363733 A1 12/2015 Brown
2015/0365323 A1 12/2015 Duminuco et al.
2015/0372943 A1 12/2015 Hasan et al.
2015/0372982 A1 12/2015 Herle et al.
2015/0381407 A1 12/2015 Wang et al.
2015/0381462 A1 12/2015 Choi et al.
2015/0381493 A1 12/2015 Bansal et al.
2016/0019317 A1 1/2016 Pawar et al.
2016/0020844 A1 1/2016 Hart et al.
2016/0021597 A1 1/2016 Hart et al.
2016/0035183 A1 2/2016 Buchholz et al.
2016/0036924 A1 2/2016 Koppolu et al.
2016/0036938 A1 2/2016 Aviles et al.
2016/0037434 A1 2/2016 Gopal et al.
2016/0072669 A1 3/2016 Saavedra
2016/0072684 A1 3/2016 Manuguri et al.
2016/0080268 A1 3/2016 Anand et al.
2016/0080502 A1 3/2016 Yadav et al.
2016/0105353 A1 4/2016 Cociglio
2016/0105392 A1 4/2016 Thakkar et al.
2016/0105471 A1 4/2016 Nunes et al.
2016/0105488 A1 4/2016 Thakkar et al.
2016/0117185 A1 4/2016 Fang et al.
2016/0134461 A1 5/2016 Sampath et al.
2016/0134527 A1 5/2016 Kwak et al.
2016/0134528 A1 5/2016 Lin et al.
2016/0134591 A1 5/2016 Liao et al.
2016/0142373 A1 5/2016 Ossipov
2016/0147607 A1 5/2016 Dornemann et al.
2016/0150055 A1 5/2016 Choi
2016/0164832 A1 6/2016 Bellagamba et al.
2016/0164914 A1 6/2016 Madhav et al.
2016/0173338 A1 6/2016 Wolting
2016/0191363 A1 6/2016 Haraszti et al.
2016/0191374 A1 6/2016 Singh et al.
2016/0192403 A1 6/2016 Gupta et al.
2016/0197834 A1 7/2016 Luft
2016/0197835 A1 7/2016 Luft
2016/0198003 A1 7/2016 Luft
2016/0205071 A1 7/2016 Cooper et al.
2016/0210209 A1 7/2016 Verkaik et al.
2016/0212773 A1 7/2016 Kanderholm et al.
2016/0218947 A1 7/2016 Hughes et al.
2016/0218951 A1 7/2016 Vasseur et al.
2016/0234099 A1 8/2016 Jiao
2016/0234161 A1 8/2016 Banerjee et al.
2016/0255169 A1 9/2016 Kovvuri et al.
2016/0255542 A1 9/2016 Hughes et al.
2016/0261493 A1 9/2016 Li
2016/0261495 A1 9/2016 Xia et al.
2016/0261506 A1 9/2016 Hegde et al.
2016/0261639 A1 9/2016 Xu
2016/0269298 A1 9/2016 Li et al.
2016/0269926 A1 9/2016 Sundaram
2016/0285736 A1 9/2016 Gu
2016/0299775 A1 10/2016 Madapurath et al.
2016/0301471 A1 10/2016 Kunz et al.
2016/0308762 A1 10/2016 Teng et al.
2016/0315912 A1 10/2016 Mayya et al.
2016/0323377 A1 11/2016 Einkauf et al.
2016/0328159 A1 11/2016 Coddington et al.
2016/0330111 A1 11/2016 Manghirmalani et al.
2016/0337202 A1 11/2016 Ben-Itzhak et al.
2016/0352588 A1 12/2016 Subbarayan et al.
2016/0353268 A1 12/2016 Senarath et al.
2016/0359738 A1 12/2016 Sullenberger et al.
2016/0366187 A1 12/2016 Kamble
2016/0371153 A1 12/2016 Dornemann
2016/0378527 A1 12/2016 Zamir
2016/0380886 A1 12/2016 Blair et al.
2016/0380906 A1 12/2016 Hodique et al.
2017/0005986 A1 1/2017 Bansal et al.
2017/0006499 A1 1/2017 Hampel et al.
2017/0012870 A1 1/2017 Blair et al.
2017/0019428 A1 1/2017 Cohn
2017/0024260 A1 1/2017 Chandrasekaran et al.
2017/0026273 A1 1/2017 Yao et al.
2017/0026283 A1 1/2017 Williams et al.
2017/0026355 A1 1/2017 Mathaiyan et al.

(56) References Cited

U.S. PATENT DOCUMENTS

| | | | |
|---|---|---|---|
| 2017/0034046 | A1 | 2/2017 | Cai et al. |
| 2017/0034052 | A1 | 2/2017 | Chanda et al. |
| 2017/0034129 | A1 | 2/2017 | Sawant et al. |
| 2017/0048296 | A1 | 2/2017 | Ramalho et al. |
| 2017/0053258 | A1 | 2/2017 | Carney et al. |
| 2017/0055131 | A1 | 2/2017 | Kong et al. |
| 2017/0063674 | A1 | 3/2017 | Maskalik et al. |
| 2017/0063782 | A1 | 3/2017 | Jain et al. |
| 2017/0063783 | A1 | 3/2017 | Yong et al. |
| 2017/0063794 | A1 | 3/2017 | Jain et al. |
| 2017/0064005 | A1 | 3/2017 | Lee |
| 2017/0075710 | A1 | 3/2017 | Prasad et al. |
| 2017/0093625 | A1 | 3/2017 | Pera et al. |
| 2017/0097841 | A1 | 4/2017 | Chang et al. |
| 2017/0104653 | A1 | 4/2017 | Badea et al. |
| 2017/0104755 | A1 | 4/2017 | Arregoces et al. |
| 2017/0109212 | A1 | 4/2017 | Gaurav et al. |
| 2017/0118067 | A1 | 4/2017 | Vedula |
| 2017/0118173 | A1 | 4/2017 | Arramreddy et al. |
| 2017/0123939 | A1 | 5/2017 | Maheshwari et al. |
| 2017/0126475 | A1 | 5/2017 | Mahkonen et al. |
| 2017/0126516 | A1 | 5/2017 | Tiagi et al. |
| 2017/0126564 | A1 | 5/2017 | Mayya et al. |
| 2017/0134186 | A1 | 5/2017 | Mukundan et al. |
| 2017/0134520 | A1 | 5/2017 | Abbasi et al. |
| 2017/0139789 | A1 | 5/2017 | Fries et al. |
| 2017/0142000 | A1 | 5/2017 | Cai et al. |
| 2017/0149637 | A1 | 5/2017 | Banikazemi et al. |
| 2017/0155557 | A1 | 6/2017 | Desai et al. |
| 2017/0155566 | A1 | 6/2017 | Martinsen et al. |
| 2017/0155590 | A1 | 6/2017 | Dillon et al. |
| 2017/0163473 | A1 | 6/2017 | Sadana et al. |
| 2017/0171024 | A1 | 6/2017 | Anerousis et al. |
| 2017/0171310 | A1 | 6/2017 | Gardner |
| 2017/0180220 | A1 | 6/2017 | Leckey et al. |
| 2017/0181210 | A1 | 6/2017 | Nadella et al. |
| 2017/0195161 | A1 | 7/2017 | Ruel et al. |
| 2017/0195169 | A1 | 7/2017 | Mills et al. |
| 2017/0201568 | A1 | 7/2017 | Hussam et al. |
| 2017/0201585 | A1 | 7/2017 | Doraiswamy et al. |
| 2017/0207976 | A1 | 7/2017 | Rovner et al. |
| 2017/0214545 | A1 | 7/2017 | Cheng et al. |
| 2017/0214701 | A1 | 7/2017 | Hasan |
| 2017/0223117 | A1 | 8/2017 | Messerli et al. |
| 2017/0236060 | A1 | 8/2017 | Ignatyev |
| 2017/0237710 | A1 | 8/2017 | Mayya et al. |
| 2017/0242784 | A1 | 8/2017 | Heorhiadi et al. |
| 2017/0257260 | A1 | 9/2017 | Govindan et al. |
| 2017/0257309 | A1 | 9/2017 | Appanna |
| 2017/0264496 | A1 | 9/2017 | Ao et al. |
| 2017/0279717 | A1 | 9/2017 | Bethers et al. |
| 2017/0279741 | A1 | 9/2017 | Elias et al. |
| 2017/0279803 | A1 | 9/2017 | Desai et al. |
| 2017/0280474 | A1 | 9/2017 | Vesterinen et al. |
| 2017/0288987 | A1 | 10/2017 | Pasupathy et al. |
| 2017/0289002 | A1 | 10/2017 | Ganguli et al. |
| 2017/0289027 | A1 | 10/2017 | Ratnasingham |
| 2017/0295264 | A1 | 10/2017 | Touitou et al. |
| 2017/0302501 | A1 | 10/2017 | Shi et al. |
| 2017/0302565 | A1 | 10/2017 | Ghobadi et al. |
| 2017/0310641 | A1 | 10/2017 | Jiang et al. |
| 2017/0310691 | A1 | 10/2017 | Vasseur et al. |
| 2017/0317945 | A1 | 11/2017 | Guo et al. |
| 2017/0317954 | A1 | 11/2017 | Masurekar et al. |
| 2017/0317969 | A1 | 11/2017 | Masurekar et al. |
| 2017/0317974 | A1 | 11/2017 | Masurekar et al. |
| 2017/0324628 | A1 | 11/2017 | Dhanabalan |
| 2017/0337086 | A1 | 11/2017 | Zhu et al. |
| 2017/0339022 | A1 | 11/2017 | Hegde et al. |
| 2017/0339054 | A1 | 11/2017 | Yadav et al. |
| 2017/0339070 | A1 | 11/2017 | Chang et al. |
| 2017/0346722 | A1 | 11/2017 | Smith et al. |
| 2017/0364419 | A1 | 12/2017 | Lo |
| 2017/0366445 | A1 | 12/2017 | Nemirovsky et al. |
| 2017/0366467 | A1 | 12/2017 | Martin et al. |
| 2017/0373950 | A1 | 12/2017 | Szilagyi et al. |
| 2017/0374174 | A1 | 12/2017 | Evens et al. |
| 2018/0006995 | A1 | 1/2018 | Bickhart et al. |
| 2018/0007005 | A1 | 1/2018 | Chanda et al. |
| 2018/0007123 | A1 | 1/2018 | Cheng et al. |
| 2018/0013636 | A1 | 1/2018 | Seetharamaiah et al. |
| 2018/0014051 | A1 | 1/2018 | Phillips et al. |
| 2018/0020035 | A1 | 1/2018 | Boggia et al. |
| 2018/0034668 | A1 | 2/2018 | Mayya et al. |
| 2018/0041425 | A1 | 2/2018 | Zhang |
| 2018/0062875 | A1 | 3/2018 | Tumuluru |
| 2018/0062914 | A1 | 3/2018 | Boutros et al. |
| 2018/0062917 | A1 | 3/2018 | Chandrashekhar et al. |
| 2018/0063036 | A1 | 3/2018 | Chandrashekhar et al. |
| 2018/0063193 | A1 | 3/2018 | Chandrashekhar et al. |
| 2018/0063233 | A1 | 3/2018 | Park |
| 2018/0063743 | A1 | 3/2018 | Tumuluru et al. |
| 2018/0069924 | A1 | 3/2018 | Tumuluru et al. |
| 2018/0074909 | A1 | 3/2018 | Bishop et al. |
| 2018/0077081 | A1 | 3/2018 | Lauer et al. |
| 2018/0077202 | A1 | 3/2018 | Xu |
| 2018/0084081 | A1 | 3/2018 | Kuchibhotla et al. |
| 2018/0091370 | A1 | 3/2018 | Arai |
| 2018/0097725 | A1 | 4/2018 | Wood et al. |
| 2018/0114569 | A1 | 4/2018 | Strachan et al. |
| 2018/0123910 | A1 | 5/2018 | Fitzgibbon |
| 2018/0123946 | A1 | 5/2018 | Ramachandran et al. |
| 2018/0131608 | A1 | 5/2018 | Jiang et al. |
| 2018/0131615 | A1 | 5/2018 | Zhang |
| 2018/0131720 | A1 | 5/2018 | Hobson et al. |
| 2018/0145899 | A1 | 5/2018 | Rao |
| 2018/0159796 | A1 | 6/2018 | Wang et al. |
| 2018/0159856 | A1 | 6/2018 | Gujarathi |
| 2018/0167378 | A1 | 6/2018 | Kostyukov et al. |
| 2018/0176073 | A1 | 6/2018 | Dubey et al. |
| 2018/0176082 | A1 | 6/2018 | Katz et al. |
| 2018/0176130 | A1 | 6/2018 | Banerjee et al. |
| 2018/0176252 | A1 | 6/2018 | Nimmagadda et al. |
| 2018/0181423 | A1 | 6/2018 | Gunda et al. |
| 2018/0205746 | A1 | 7/2018 | Boutnaru et al. |
| 2018/0213472 | A1 | 7/2018 | Ishii et al. |
| 2018/0219765 | A1 | 8/2018 | Michael et al. |
| 2018/0219766 | A1 | 8/2018 | Michael et al. |
| 2018/0234300 | A1 | 8/2018 | Mayya et al. |
| 2018/0248790 | A1 | 8/2018 | Tan et al. |
| 2018/0260125 | A1 | 9/2018 | Botes et al. |
| 2018/0261085 | A1 | 9/2018 | Liu et al. |
| 2018/0262468 | A1 | 9/2018 | Kumar et al. |
| 2018/0270104 | A1 | 9/2018 | Zheng et al. |
| 2018/0278541 | A1 | 9/2018 | Wu et al. |
| 2018/0287907 | A1 | 10/2018 | Kulshreshtha et al. |
| 2018/0295101 | A1 | 10/2018 | Gehrmann |
| 2018/0295529 | A1 | 10/2018 | Jen et al. |
| 2018/0302286 | A1 | 10/2018 | Mayya et al. |
| 2018/0302321 | A1 | 10/2018 | Manthiramoorthy et al. |
| 2018/0307851 | A1 | 10/2018 | Lewis |
| 2018/0316606 | A1 | 11/2018 | Sung et al. |
| 2018/0351855 | A1 | 12/2018 | Sood et al. |
| 2018/0351862 | A1 | 12/2018 | Jeganathan et al. |
| 2018/0351863 | A1 | 12/2018 | Vairavakkalai et al. |
| 2018/0351882 | A1 | 12/2018 | Jeganathan et al. |
| 2018/0359323 | A1 | 12/2018 | Madden |
| 2018/0367445 | A1 | 12/2018 | Bajaj |
| 2018/0373558 | A1 | 12/2018 | Chang et al. |
| 2018/0375744 | A1 | 12/2018 | Mayya et al. |
| 2018/0375824 | A1 | 12/2018 | Mayya et al. |
| 2018/0375967 | A1 | 12/2018 | Pithawala et al. |
| 2019/0013883 | A1 | 1/2019 | Vargas et al. |
| 2019/0014038 | A1 | 1/2019 | Ritchie |
| 2019/0020588 | A1 | 1/2019 | Twitchell, Jr. |
| 2019/0020627 | A1 | 1/2019 | Yuan |
| 2019/0021085 | A1 | 1/2019 | Mochizuki et al. |
| 2019/0028378 | A1 | 1/2019 | Houjyo et al. |
| 2019/0028552 | A1 | 1/2019 | Johnson et al. |
| 2019/0036808 | A1 | 1/2019 | Shenoy et al. |
| 2019/0036810 | A1 | 1/2019 | Michael et al. |
| 2019/0036813 | A1 | 1/2019 | Shenoy et al. |
| 2019/0046056 | A1 | 2/2019 | Khachaturian et al. |
| 2019/0058657 | A1 | 2/2019 | Chunduri et al. |

(56) References Cited

U.S. PATENT DOCUMENTS

2019/0058709 A1 2/2019 Kempf et al.
2019/0068470 A1 2/2019 Mirsky
2019/0068493 A1 2/2019 Ram et al.
2019/0068500 A1 2/2019 Hira
2019/0075083 A1 3/2019 Mayya et al.
2019/0081894 A1 3/2019 Yousaf et al.
2019/0103990 A1 4/2019 Cidon et al.
2019/0103991 A1 4/2019 Cidon et al.
2019/0103992 A1 4/2019 Cidon et al.
2019/0103993 A1 4/2019 Cidon et al.
2019/0104035 A1* 4/2019 Cidon .................. H04L 45/586
2019/0104049 A1 4/2019 Cidon et al.
2019/0104050 A1 4/2019 Cidon et al.
2019/0104051 A1 4/2019 Cidon et al.
2019/0104052 A1 4/2019 Cidon et al.
2019/0104053 A1 4/2019 Cidon et al.
2019/0104063 A1 4/2019 Cidon et al.
2019/0104064 A1 4/2019 Cidon et al.
2019/0104109 A1 4/2019 Cidon et al.
2019/0104111 A1 4/2019 Cidon et al.
2019/0104413 A1 4/2019 Cidon et al.
2019/0109769 A1 4/2019 Jain et al.
2019/0132221 A1 5/2019 Boutros et al.
2019/0132234 A1 5/2019 Dong et al.
2019/0132322 A1 5/2019 Song et al.
2019/0140889 A1 5/2019 Mayya et al.
2019/0140890 A1 5/2019 Mayya et al.
2019/0149525 A1 5/2019 Gunda et al.
2019/0158371 A1 5/2019 Dillon et al.
2019/0158605 A1* 5/2019 Markuze ............. H04L 12/4641
2019/0199539 A1 6/2019 Deng et al.
2019/0220703 A1 7/2019 Prakash et al.
2019/0222499 A1 7/2019 Chen et al.
2019/0238364 A1 8/2019 Boutros et al.
2019/0238446 A1 8/2019 Barzik et al.
2019/0238449 A1 8/2019 Michael et al.
2019/0238450 A1 8/2019 Michael et al.
2019/0238483 A1 8/2019 Marichetty et al.
2019/0238497 A1 8/2019 Tourrilhes et al.
2019/0268421 A1 8/2019 Markuze et al.
2019/0268973 A1 8/2019 Bull et al.
2019/0278631 A1 9/2019 Bernat et al.
2019/0280962 A1 9/2019 Michael et al.
2019/0280963 A1 9/2019 Michael et al.
2019/0280964 A1 9/2019 Michael et al.
2019/0288875 A1 9/2019 Shen et al.
2019/0306197 A1 10/2019 Degioanni
2019/0306282 A1 10/2019 Masputra et al.
2019/0313278 A1 10/2019 Liu
2019/0313907 A1 10/2019 Khachaturian et al.
2019/0319847 A1 10/2019 Nahar et al.
2019/0319881 A1 10/2019 Maskara et al.
2019/0327109 A1 10/2019 Guichard et al.
2019/0334786 A1 10/2019 Dutta et al.
2019/0334813 A1 10/2019 Raj et al.
2019/0334820 A1 10/2019 Zhao
2019/0342201 A1 11/2019 Singh
2019/0342219 A1 11/2019 Liu et al.
2019/0356736 A1 11/2019 Narayanaswamy et al.
2019/0364099 A1 11/2019 Thakkar et al.
2019/0364456 A1 11/2019 Yu
2019/0372888 A1 12/2019 Michael et al.
2019/0372889 A1 12/2019 Michael et al.
2019/0372890 A1 12/2019 Michael et al.
2019/0394081 A1 12/2019 Tahhan et al.
2020/0014609 A1 1/2020 Hockett et al.
2020/0014615 A1 1/2020 Michael et al.
2020/0014616 A1 1/2020 Michael et al.
2020/0014661 A1 1/2020 Mayya et al.
2020/0014663 A1 1/2020 Chen et al.
2020/0021514 A1 1/2020 Michael et al.
2020/0021515 A1 1/2020 Michael et al.
2020/0036624 A1 1/2020 Michael et al.
2020/0044943 A1 2/2020 Bor-Yaliniz et al.
2020/0044969 A1 2/2020 Hao et al.
2020/0059420 A1 2/2020 Abraham
2020/0059457 A1 2/2020 Raza et al.
2020/0059459 A1 2/2020 Abraham et al.
2020/0067831 A1 2/2020 Spraggins et al.
2020/0092207 A1 3/2020 Sipra et al.
2020/0097327 A1 3/2020 Beyer et al.
2020/0099625 A1 3/2020 Yigit et al.
2020/0099659 A1 3/2020 Cometto et al.
2020/0106696 A1 4/2020 Michael et al.
2020/0106706 A1 4/2020 Mayya et al.
2020/0119952 A1 4/2020 Mayya et al.
2020/0127905 A1 4/2020 Mayya et al.
2020/0127911 A1 4/2020 Gilson et al.
2020/0153701 A1 5/2020 Mohan et al.
2020/0153736 A1 5/2020 Liebherr et al.
2020/0159661 A1 5/2020 Keymolen et al.
2020/0162407 A1 5/2020 Tillotson
2020/0169473 A1 5/2020 Rimar et al.
2020/0177503 A1 6/2020 Hooda et al.
2020/0177550 A1 6/2020 Valluri et al.
2020/0177629 A1 6/2020 Hooda et al.
2020/0186471 A1 6/2020 Shen et al.
2020/0195557 A1 6/2020 Duan et al.
2020/0204460 A1 6/2020 Schneider et al.
2020/0213212 A1 7/2020 Dillon et al.
2020/0213224 A1 7/2020 Cheng et al.
2020/0218558 A1 7/2020 Sreenath et al.
2020/0235990 A1 7/2020 Janakiraman et al.
2020/0235999 A1 7/2020 Mayya et al.
2020/0236046 A1 7/2020 Jain et al.
2020/0241927 A1 7/2020 Yang et al.
2020/0244721 A1 7/2020 S et al.
2020/0252234 A1 8/2020 Ramamoorthi et al.
2020/0259700 A1 8/2020 Bhalla et al.
2020/0267184 A1 8/2020 Vera-Schockner
2020/0267203 A1 8/2020 Jindal et al.
2020/0280587 A1 9/2020 Janakiraman et al.
2020/0287819 A1 9/2020 Theogaraj et al.
2020/0287976 A1 9/2020 Theogaraj et al.
2020/0296011 A1 9/2020 Jain et al.
2020/0296026 A1 9/2020 Michael et al.
2020/0301764 A1 9/2020 Thoresen et al.
2020/0314006 A1 10/2020 Mackie et al.
2020/0314614 A1 10/2020 Moustafa et al.
2020/0322230 A1 10/2020 Natal et al.
2020/0322287 A1 10/2020 Connor et al.
2020/0336336 A1 10/2020 Sethi et al.
2020/0344089 A1 10/2020 Motwani et al.
2020/0344143 A1 10/2020 Faseela et al.
2020/0344163 A1 10/2020 Gupta et al.
2020/0351188 A1 11/2020 Arora et al.
2020/0358878 A1 11/2020 Bansal et al.
2020/0366530 A1 11/2020 Mukundan et al.
2020/0366562 A1 11/2020 Mayya et al.
2020/0382345 A1 12/2020 Zhao et al.
2020/0382387 A1 12/2020 Pasupathy et al.
2020/0403821 A1 12/2020 Dev et al.
2020/0412483 A1 12/2020 Tan et al.
2020/0412576 A1 12/2020 Kondapavuluru et al.
2020/0413283 A1 12/2020 Shen et al.
2021/0006482 A1 1/2021 Hwang et al.
2021/0006490 A1 1/2021 Michael et al.
2021/0021538 A1 1/2021 Meck et al.
2021/0029019 A1 1/2021 Kottapalli
2021/0029088 A1 1/2021 Mayya et al.
2021/0036888 A1 2/2021 Makkalla et al.
2021/0036987 A1 2/2021 Mishra et al.
2021/0037159 A1 2/2021 Shimokawa
2021/0049191 A1 2/2021 Masson et al.
2021/0067372 A1 3/2021 Cidon et al.
2021/0067373 A1 3/2021 Cidon et al.
2021/0067374 A1 3/2021 Cidon et al.
2021/0067375 A1 3/2021 Cidon et al.
2021/0067407 A1 3/2021 Cidon et al.
2021/0067427 A1 3/2021 Cidon et al.
2021/0067442 A1 3/2021 Sundararajan et al.
2021/0067461 A1 3/2021 Cidon et al.
2021/0067464 A1* 3/2021 Cidon ................. H04L 63/0272
2021/0067467 A1 3/2021 Cidon et al.

(56) References Cited

U.S. PATENT DOCUMENTS

| | | | |
|---|---|---|---|
| 2021/0067468 A1 | 3/2021 | Cidon et al. | |
| 2021/0073001 A1 | 3/2021 | Rogers et al. | |
| 2021/0092062 A1 | 3/2021 | Dhanabalan et al. | |
| 2021/0099360 A1 | 4/2021 | Parsons et al. | |
| 2021/0105199 A1 | 4/2021 | H et al. | |
| 2021/0111998 A1 | 4/2021 | Saavedra | |
| 2021/0112034 A1 | 4/2021 | Sundararajan et al. | |
| 2021/0126830 A1 | 4/2021 | R et al. | |
| 2021/0126853 A1 | 4/2021 | Ramaswamy et al. | |
| 2021/0126854 A1 | 4/2021 | Guo et al. | |
| 2021/0126860 A1 | 4/2021 | Ramaswamy et al. | |
| 2021/0144091 A1 | 5/2021 | H et al. | |
| 2021/0160169 A1 | 5/2021 | Shen et al. | |
| 2021/0160813 A1 | 5/2021 | Gupta et al. | |
| 2021/0176255 A1 | 6/2021 | Hill et al. | |
| 2021/0184952 A1 | 6/2021 | Mayya et al. | |
| 2021/0184966 A1 | 6/2021 | Ramaswamy et al. | |
| 2021/0184983 A1 | 6/2021 | Ramaswamy et al. | |
| 2021/0194814 A1 | 6/2021 | Roux et al. | |
| 2021/0226880 A1 | 7/2021 | Ramamoorthy et al. | |
| 2021/0234728 A1 | 7/2021 | Cidon et al. | |
| 2021/0234775 A1 | 7/2021 | Devadoss et al. | |
| 2021/0234786 A1 | 7/2021 | Devadoss et al. | |
| 2021/0234804 A1 | 7/2021 | Devadoss et al. | |
| 2021/0234805 A1 | 7/2021 | Devadoss et al. | |
| 2021/0235312 A1 | 7/2021 | Devadoss et al. | |
| 2021/0235313 A1 | 7/2021 | Devadoss et al. | |
| 2021/0266262 A1 | 8/2021 | Subramanian et al. | |
| 2021/0279069 A1 | 9/2021 | Salgaonkar et al. | |
| 2021/0314289 A1 | 10/2021 | Chandrashekhar et al. | |
| 2021/0314385 A1 | 10/2021 | Pande et al. | |
| 2021/0328835 A1 | 10/2021 | Mayya et al. | |
| 2021/0336880 A1 | 10/2021 | Gupta et al. | |
| 2021/0377109 A1 | 12/2021 | Shrivastava et al. | |
| 2021/0377156 A1 | 12/2021 | Michael et al. | |
| 2021/0392060 A1 | 12/2021 | Silva et al. | |
| 2021/0392070 A1 | 12/2021 | Tootaghaj et al. | |
| 2021/0399920 A1 | 12/2021 | Sundararajan et al. | |
| 2021/0399978 A9 | 12/2021 | Michael et al. | |
| 2021/0400113 A1 | 12/2021 | Markuze et al. | |
| 2021/0400512 A1 | 12/2021 | Agarwal et al. | |
| 2021/0409277 A1 | 12/2021 | Jeuk et al. | |
| 2022/0006726 A1 | 1/2022 | Michael et al. | |
| 2022/0006751 A1 | 1/2022 | Ramaswamy et al. | |
| 2022/0006756 A1 | 1/2022 | Ramaswamy et al. | |
| 2022/0029902 A1 | 1/2022 | Shemer et al. | |
| 2022/0035673 A1 | 2/2022 | Markuze et al. | |
| 2022/0038370 A1 | 2/2022 | Vasseur et al. | |
| 2022/0038557 A1 | 2/2022 | Markuze et al. | |
| 2022/0045927 A1 | 2/2022 | Liu et al. | |
| 2022/0052928 A1 | 2/2022 | Sundararajan et al. | |
| 2022/0061059 A1 | 2/2022 | Dunsmore et al. | |
| 2022/0086035 A1 | 3/2022 | Devaraj et al. | |
| 2022/0094644 A1 | 3/2022 | Cidon et al. | |
| 2022/0123961 A1 | 4/2022 | Mukundan et al. | |
| 2022/0131740 A1 | 4/2022 | Mayya et al. | |
| 2022/0131807 A1 | 4/2022 | Srinivas et al. | |
| 2022/0131898 A1 | 4/2022 | Hooda et al. | |
| 2022/0141184 A1 | 5/2022 | Oswal et al. | |
| 2022/0158923 A1 | 5/2022 | Ramaswamy et al. | |
| 2022/0158924 A1 | 5/2022 | Ramaswamy et al. | |
| 2022/0158926 A1 | 5/2022 | Wennerstrom et al. | |
| 2022/0166713 A1 | 5/2022 | Markuze et al. | |
| 2022/0191719 A1 | 6/2022 | Roy | |
| 2022/0198229 A1 | 6/2022 | López et al. | |
| 2022/0210035 A1 | 6/2022 | Hendrickson et al. | |
| 2022/0210041 A1 | 6/2022 | Gandhi et al. | |
| 2022/0210042 A1 | 6/2022 | Gandhi et al. | |
| 2022/0210122 A1 | 6/2022 | Levin et al. | |
| 2022/0217015 A1 | 7/2022 | Vuggrala et al. | |
| 2022/0231949 A1 | 7/2022 | Ramaswamy et al. | |
| 2022/0231950 A1 | 7/2022 | Ramaswamy et al. | |
| 2022/0232411 A1 | 7/2022 | Vijayakumar et al. | |
| 2022/0239596 A1 | 7/2022 | Kumar et al. | |
| 2022/0294701 A1 | 9/2022 | Mayya et al. | |
| 2022/0335027 A1 | 10/2022 | Seshadri et al. | |
| 2022/0337553 A1 | 10/2022 | Mayya et al. | |
| 2022/0353152 A1 | 11/2022 | Ramaswamy | |
| 2022/0353171 A1 | 11/2022 | Ramaswamy et al. | |
| 2022/0353175 A1 | 11/2022 | Ramaswamy et al. | |
| 2022/0353182 A1 | 11/2022 | Ramaswamy et al. | |
| 2022/0353190 A1 | 11/2022 | Ramaswamy et al. | |
| 2022/0360500 A1 | 11/2022 | Ramaswamy et al. | |
| 2022/0407773 A1 | 12/2022 | Kempanna et al. | |
| 2022/0407774 A1 | 12/2022 | Kempanna et al. | |
| 2022/0407790 A1 | 12/2022 | Kempanna et al. | |
| 2022/0407820 A1 | 12/2022 | Kempanna et al. | |
| 2022/0407915 A1 | 12/2022 | Kempanna et al. | |
| 2023/0006929 A1 | 1/2023 | Mayya et al. | |
| 2023/0025586 A1 | 1/2023 | Rolando et al. | |
| 2023/0026330 A1 | 1/2023 | Rolando et al. | |
| 2023/0026865 A1 | 1/2023 | Rolando et al. | |
| 2023/0028872 A1 | 1/2023 | Ramaswamy | |
| 2023/0039869 A1 | 2/2023 | Ramaswamy et al. | |
| 2023/0041916 A1 | 2/2023 | Zhang et al. | |
| 2023/0054961 A1 | 2/2023 | Ramaswamy et al. | |
| 2023/0105680 A1 | 4/2023 | Simlai et al. | |
| 2023/0121871 A1 | 4/2023 | Mayya et al. | |
| 2023/0179445 A1 | 6/2023 | Cidon et al. | |
| 2023/0179502 A1 | 6/2023 | Ramaswamy et al. | |
| 2023/0179521 A1 | 6/2023 | Markuze et al. | |
| 2023/0179543 A1 | 6/2023 | Cidon et al. | |
| 2023/0216768 A1 | 7/2023 | Zohar et al. | |
| 2023/0216801 A1 | 7/2023 | Markuze et al. | |
| 2023/0216804 A1 | 7/2023 | Zohar et al. | |
| 2023/0221874 A1 | 7/2023 | Markuze et al. | |
| 2023/0224356 A1 | 7/2023 | Markuze et al. | |
| 2023/0224759 A1 | 7/2023 | Ramaswamy | |
| 2023/0231845 A1 | 7/2023 | Manoharan et al. | |
| 2023/0239234 A1 | 7/2023 | Zohar et al. | |
| 2023/0261974 A1 | 8/2023 | Ramaswamy et al. | |
| 2023/0300560 A1* | 9/2023 | Chandrasekaran ... | H04W 4/021<br>370/329 |

FOREIGN PATENT DOCUMENTS

| | | | |
|---|---|---|---|
| CN | 102811165 | A | 12/2012 |
| CN | 104956329 | A | 9/2015 |
| CN | 106656847 | A | 5/2017 |
| CN | 106998284 | A | 8/2017 |
| CN | 110447209 | A | 11/2019 |
| CN | 111198764 | A | 5/2020 |
| EP | 1912381 | A1 | 4/2008 |
| EP | 2538637 | A2 | 12/2012 |
| EP | 2763362 | A1 | 8/2014 |
| EP | 3041178 | A1 | 7/2016 |
| EP | 3297211 | A1 | 3/2018 |
| EP | 3509256 | A1 | 7/2019 |
| EP | 3346650 | B1 | 11/2019 |
| IN | 106230650 | A | 12/2016 |
| JP | 2002368792 | A | 12/2002 |
| JP | 2010233126 | A | 10/2010 |
| JP | 2014200010 | A | 10/2014 |
| JP | 2017059991 | A | 3/2017 |
| JP | 2017524290 | A | 8/2017 |
| KR | 20170058201 | A | 5/2017 |
| RU | 2574350 | C2 | 2/2016 |
| WO | 03073701 | A1 | 9/2003 |
| WO | 2005071861 | A1 | 8/2005 |
| WO | 2007016834 | A1 | 2/2007 |
| WO | 2012167184 | A2 | 12/2012 |
| WO | 2015092565 | A1 | 6/2015 |
| WO | 2016061546 | A1 | 4/2016 |
| WO | 2016123314 | A1 | 8/2016 |
| WO | 2017083975 | A1 | 5/2017 |
| WO | 2019070611 | A1 | 4/2019 |
| WO | 2019094522 | A1 | 5/2019 |
| WO | 2020012491 | A1 | 1/2020 |
| WO | 2020018704 | A1 | 1/2020 |
| WO | 2020091777 | A1 | 5/2020 |
| WO | 2020101922 | A1 | 5/2020 |
| WO | 2020112345 | A1 | 6/2020 |
| WO | 2021040934 | A1 | 3/2021 |
| WO | 2021118717 | A1 | 6/2021 |

(56) References Cited

FOREIGN PATENT DOCUMENTS

| | | | |
|---|---|---|---|
| WO | 2021150465 | A1 | 7/2021 |
| WO | 2021211906 | A1 | 10/2021 |
| WO | 2022005607 | A1 | 1/2022 |
| WO | 2022082680 | A1 | 4/2022 |
| WO | 2022154850 | A1 | 7/2022 |
| WO | 2022159156 | A1 | 7/2022 |
| WO | 2022231668 | A1 | 11/2022 |
| WO | 2022235303 | A1 | 11/2022 |
| WO | 2022265681 | A1 | 12/2022 |
| WO | 2023009159 | A1 | 2/2023 |

OTHER PUBLICATIONS

Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.

Tootaghaj, Diman Zad, et al., "Homa: An Efficient Topology and Route Management Approach in SD-WAN Overlays," IEEE Infocom 2020—IEEE Conference on Computer Communications, Jul. 6-9, 2020, 10 pages, IEEE, Toronto, ON, Canada.

Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

PCT International Search Report and Written Opinion, PCT/US2023/025795, Oct. 2, 2023, 19 pages.

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Author Unknown, "VeloCloud Administration Guide: VMware SD-WAN by VeloCloud 3.3," Month Unknown 2019, 366 pages, VMware, Inc., Palo Alto, CA, USA.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE Infocom 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.

Guo, Xiangyi, et al., (U.S. Appl. No. 62/925,193) filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the Acm Sigcomm 2011 Conference, Aug. 15-19, 2011, 12 pages, ACM, Toronto, Canada.

Non-Published Commonly Owned Related International Patent Application PCT/US2023/025795 with similar specification, filed Jun. 21, 2023, 45 pages, VMware, Inc.

Non-Published Commonly Owned U.S. Appl. No. 17/833,555, filed Jun. 6, 2022, 34 pages, VMware, Inc.

Non-Published Commonly Owned U.S. Appl. No. 17/833,566, filed Jun. 6, 2022, 35 pages, VMware, Inc.

Non-Published Commonly Owned U.S. Appl. No. 17/976,717, filed Oct. 28, 2022, 37 pages, VMware, Inc.

(56) References Cited

OTHER PUBLICATIONS

Non-Published Commonly Owned U.S. Appl. No. 18/100,369, filed Jan. 23, 2023, 55 pages, VMware, Inc.
Non-Published Commonly Owned U.S. Appl. No. 18/100,381, filed Jan. 23, 2023, 55 pages, VMware, Inc.
Non-Published Commonly Owned U.S. Appl. No. 18/100,397, filed Jan. 23, 2023, 55 pages, VMware, Inc.
Non-Published Commonly Owned U.S. Appl. No. 18/126,989, filed Mar. 27, 2023, 83 pages, VMware, Inc.
Non-Published Commonly Owned U.S. Appl. No. 18/126,990, filed Mar. 27, 2023, 84 pages, VMware, Inc.
Non-Published Commonly Owned U.S. Appl. No. 18/126,991, filed Mar. 27, 2023, 84 pages, VMware, Inc.
Non-Published Commonly Owned U.S. Appl. No. 18/126,992, filed Mar. 27, 2023, 84 pages, VMware, Inc.
Non-Published Commonly Owned U.S. Appl. No. 18/197,090, filed May 14, 2023, 36 pages, Nicira, Inc.
Non-Published Commonly Owned U.S. Appl. No. 18/208,352, filed Jun. 12, 2023, 69 pages, VMware, Inc.
Non-Published Commonly Owned U.S. Appl. No. 18/208,356, filed Jun. 12, 2023, 69 pages, VMware, Inc.
Non-Published Commonly Owned U.S. Appl. No. 18/208,358, filed Jun. 12, 2023, 69 pages, VMware, Inc.
Non-Published Commonly Owned U.S. Appl. No. 18/211,568, filed Jun. 19, 2023, 37 pages, VMware, Inc.
Non-Published Commonly Owned U.S. Appl. No. 18/211,576, filed Jun. 19, 2023, 37 pages, VMware, Inc.
Non-Published Commonly Owned U.S. Appl. No. 18/211,578, filed Jun. 19, 2023, 36 pages, VMware, Inc.
Non-Published Commonly Owned Related U.S. Appl. No. 18/211,842 with similar specification, filed Jun. 20, 2023, 43 pages, VMware, Inc.
Non-Published Commonly Owned Related U.S. Appl. No. 18/211,850 with similar specification, filed Jun. 20, 2023, 43 pages, VMware, Inc.
Non-Published Commonly Owned U.S. Appl. No. 18/222,864, filed Jul. 17, 2023, 350 pages, VMware, Inc.
Non-Published Commonly Owned U.S. Appl. No. 18/222,868, filed Jul. 17, 2023, 22 pages, VMware, Inc.
Non-Published Commonly Owned U.S. Appl. No. 18/224,466, filed Jul. 20, 2023, 56 pages, VMware, Inc.
Non-Published Commonly Owned U.S. Appl. No. 18/235,879, filed Aug. 20, 2023, 173 pages, VMware, Inc.
Non-Published Commonly Owned U.S. Appl. No. 15/803,964, filed Nov. 6, 2017, 15 pages, The Mode Group.
Noormohammadpour, Mohammad, et al., “DCRoute: Speeding up Inter-Datacenter Traffic Allocation while Guaranteeing Deadlines,” 2016 IEEE 23rd International Conference on High Performance Computing (HiPC), Dec. 19-22, 2016, 9 pages, IEEE, Hyderabad, India.
Ray, Saikat, et al., “Always Acyclic Distributed Path Computation,” University of Pennsylvania Department of Electrical and Systems Engineering Technical Report, May 2008, 16 pages, University of Pennsylvania ScholarlyCommons.

* cited by examiner

500

600

METHOD FOR MODIFYING AN SD-WAN USING METRIC-BASED HEAT MAPS

BACKGROUND

Today, cloud-based applications are deployed across hybrid clouds and multiclouds for both availability and resiliency. However, today's SD-WAN network has standard policies that are static in nature for reliable and secure connectivity toward cloud-based applications, which can lead to sub-optimal routing and degraded user experience. Currently, cloud-based transits are provisioned across different regions around the globe in close proximity to cloud-based applications, driven primarily by business values. As a result, considerations for evolving needs of next generation cloud-native applications are lost. Additionally, secure and resilient services are statically provisioned to act as a waypoint for dynamic application clusters, leading to sub-optimal performance and/or application degradation due to the placement of the services, which tend to be located closely to sources rather than destinations.

BRIEF SUMMARY

Some embodiments of the invention provide a method for generating a heat map and using the generated heat map to modify an SD-WAN (software-defined wide-area network) deployed for a set of geographic locations. The application traffic are handled as flows which are forwarded through a set of managed forwarding elements (MFEs) that generates multiple metrics associated to each of the flows. Based on the collected metrics, the method generates a heat map that accounts for the multiple data message flows, locations of the set of MFEs, and locations of destinations of the data message flows (e.g., SD-WAN applications hosted by public or private datacenters, SaaS (software as a service) applications hosted by third-party datacenters, etc.). The method uses the generated heat map to identify at least one modification to make to the SD-WAN to improve forwarding of the data message flows.

In some embodiments, the method is performed by a management and control server (e.g., Velocloud Orchestrator (VCO)) or cluster of management and control servers for the SD-WAN. The management and control server of some embodiments collects the metrics from the set of MFEs by collecting the metrics from a compute machine designated for collected metrics and location context associated with data message flows in the SD-WAN from the set of MFEs. In some embodiments, the metrics collected by the designated compute machine include quality of experience (QoE) metrics, such as loss rate, packet delay rate, packet jitter rate, and throughput. The designated compute machine, in some embodiments, uses the collected QoE metrics to compute multiple QoE scores associated with the data message flows, and the metrics collected by the management and control server include the QoE scores. In some embodiments, the QoE scores specify traffic densities associated with the data message flows which can be used in conjunction with the heat map to identify modifications to make to the SD-WAN.

The set of MFEs, in some embodiments, include edge routers, cloud gateway routers, and hub routers for connecting datacenters to the SD-WAN. The edge routers of some embodiments are deployed at the edges of datacenters (e.g., branch sites, cloud datacenters, etc.) of an enterprise network for which the SD-WAN is implemented, and connect these datacenters to other forwarding elements (e.g., hub routers and gateway routers) of the SD-WAN. In some embodiments, the gateway routers connect the edge routers to third-party datacenters through the SD-WAN, and, in some embodiments, also perform other operations for the SD-WAN such as route advertisement. The edge routers connect to the cloud gateway routers via two channels, according to some embodiments, with one channel being a secure channel and the other channel being an unsecured channel. The hub routers of some embodiments connect different edge routers to each other. For instance, the hub routers connect edge routers at branch sites to other edge routers at other branch sites and at datacenters that host SD-WAN applications, in some embodiments.

In some embodiments, the heat map groups destinations into various destination clusters based on geographic proximity of the destinations to each other. For instance, multiple SaaS applications may be distributed across a large geographic area (e.g., the United States), with some locations of the geographic area having higher concentrations of SaaS applications than other locations (e.g., higher concentrations near large metropolitan areas). In some embodiments, any modifications to the SD-WAN are identified by first identifying a particular destination cluster at a particular location that does not include a geographically proximate MFE for forwarding data message flows to and from the particular destination cluster, and then provisioning and deploying a new MFE to the particular location to improve forwarding to and from the particular destination cluster.

In another example, some embodiments use the heat map to identify any destination clusters experiencing congestion due to high volumes of traffic to those destination clusters. In some embodiments, the locations of the identified destination clusters may already have one or more local MFEs for forwarding data message flows to and from the destination clusters, and new MFEs may be provisioned and deployed to these locations to increase the amount of resources available for forwarding data message flows to and from those destination clusters. Conversely, or conjunctively, some embodiments may implement other modifications, such as modifying physical links at branch sites and datacenters.

In some embodiments, the heat map is used to identify SD-WAN applications needing improvements. For instance, metrics (e.g., throughput, latency, packet loss, and jitter) associated with a particular SD-WAN application may indicate anomalies detected by MFEs when processing data message flows to and from the particular SD-WAN application. Based on the detected anomaly or anomalies, some embodiments modify a number of edge forwarding elements (e.g., edge routers) that connect datacenters to each other through the SD-WAN, a number of hubs (e.g., hub routers) that connect edge forwarding elements to each other through the SD-WAN, and/or link capacities of a set of links used to connect to the particular SD-WAN application. Examples of SD-WAN applications include VOIP applications, database applications, and applications for running virtual machines (VMs), according to some embodiments.

A visualization of the heat map is presented through a user interface (UI) for viewing and analysis by a user (e.g., network administrator), in some embodiments. The UI is provided in some embodiments by the management and control server, which, in some embodiments, also generates the heat map. In some embodiments, the visualization includes representations of the data message flows, representations of the set of MFEs at their respective locations, and representations of the destination and one or more destination clusters at their respective locations, according to some embodiments.

In some embodiments, the visualization is a map of the geographic area across which the SD-WAN is deployed, and with the representations of the MFEs, destinations, destination clusters, and data message flows overlaying the map. In addition to providing the visualization, the UI of some embodiments also enables the user to identify and select modifications to the SD-WAN for implementation by the components (i.e., management and control server, MFEs, etc.) of the SD-WAN. For example, the user may cause the management and control server to provision and deploy an additional cloud gateway router, and also define forwarding rules associated with the additional MFE for use by, e.g., edge routers of the SD-WAN.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
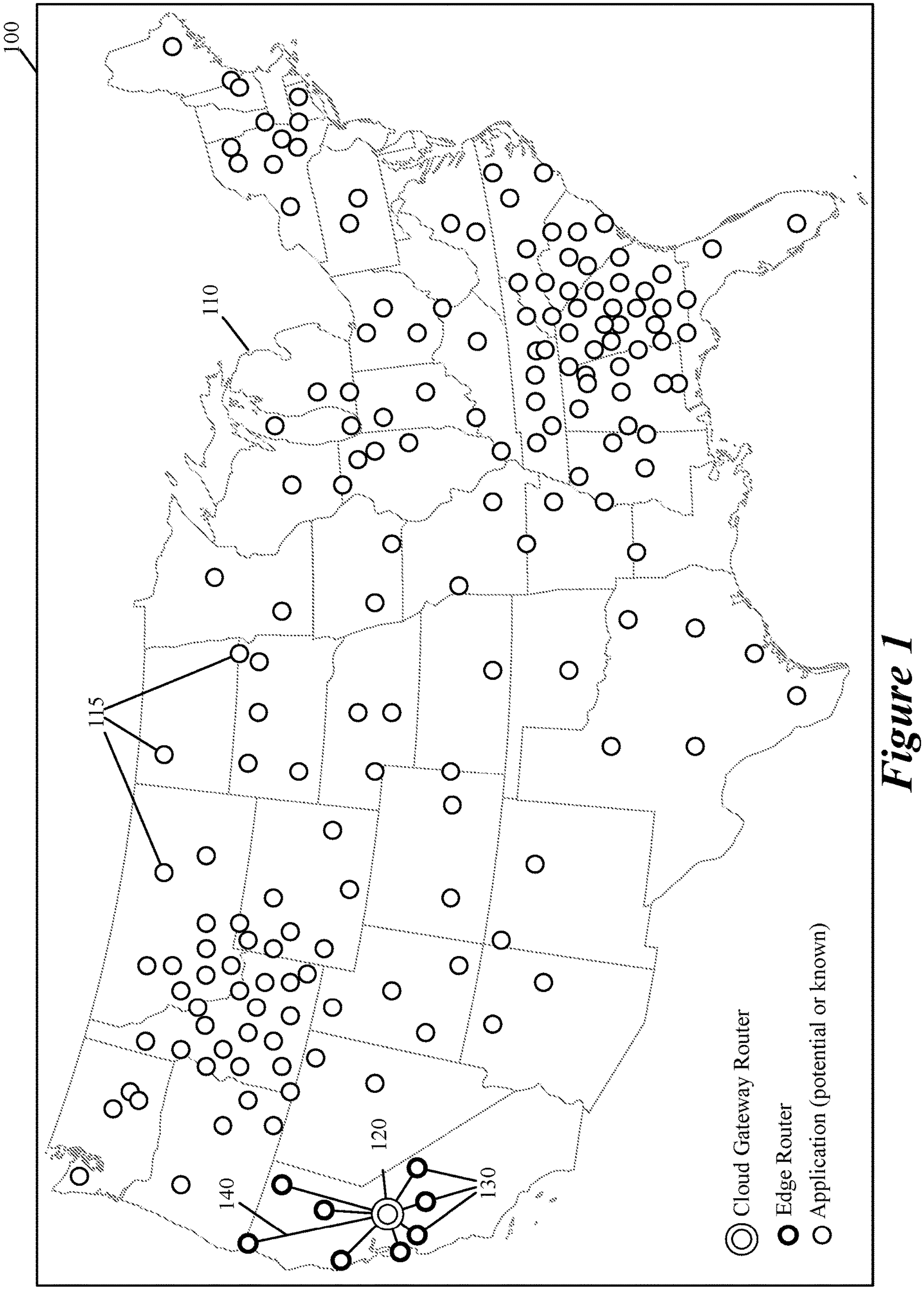
FIG. 1 illustrates an example of a visualization of a simplified heat map for an SD-WAN of a particular entity generated in some embodiments and presented through a UI.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for generating a heat map and using the generated heat map to modify an SD-WAN (software-defined wide-area network) deployed for a set of geographic locations. From a set of managed forwarding elements (MFEs) that forward data message flows through the SD-WAN, the method collects multiple metrics associated with the data message flows (e.g., metrics generated by MFEs processing the data messages flows). Based on the collected metrics, the method generates a heat map that accounts for the multiple data message flows, locations of the set of MFEs, and locations of destinations of the data message flows (e.g., SD-WAN applications hosted by public or private datacenters, SaaS (software as a service) applications hosted by third-party datacenters, etc.). The method uses the generated heat map to identify at least one modification to make to the SD-WAN to improve forwarding of the data message flows.

In some embodiments, the method is performed by a management and control server (e.g., Velocloud Orchestrator (VCO)) or cluster of management and control servers for the SD-WAN. The management and control server of some embodiments collects the metrics from the set of MFEs by collecting the metrics from a compute machine designated for collected metrics and location context associated with data message flows in the SD-WAN from the set of MFEs. In some embodiments, the metrics collected by the designated compute machine include quality of experience (QoE) metrics, such as loss rate, packet delay rate, packet jitter rate, and throughput. The designated compute machine, in some embodiments, uses the collected QoE metrics to compute multiple QoE scores associated with the data message flows, and the metrics collected by the management and control server include the QoE scores. In some embodiments, the QoE scores specify traffic densities associated with the data message flows which can be used in conjunction with the heat map to identify modifications to make to the SD-WAN.

The set of MFEs, in some embodiments, include edge routers, cloud gateway routers, and hub routers for connecting datacenters to the SD-WAN. The edge routers of some embodiments are deployed at the edges of datacenters (e.g., branch sites, cloud datacenters, etc.) of an enterprise network for which the SD-WAN is implemented, and connect these datacenters to other forwarding elements (e.g., hub routers and gateway routers) of the SD-WAN. In some embodiments, the gateway routers connect the edge routers to third-party datacenters through the SD-WAN, and, in some embodiments, also perform other operations for the SD-WAN such as router advertisement. The edge routers connect to the cloud gateway routers via two channels, according to some embodiments, with one channel being a secure channel and the other channel being an unsecured channel. The hub routers of some embodiments connect different edge routers to each other. For instance, the hub routers connect edge routers at branch sites to other edge routers at other branch sites and at datacenters that host SD-WAN applications, in some embodiments.

FIG. 1 illustrates an example of a visualization of a simplified heat map for an SD-WAN of a particular entity generated in some embodiments and presented through a UI. The heat map is generated, in some embodiments, by a management and control server for the SD-WAN (e.g., Velocloud Orchestrator (VCO)), and the visualization 100 is presented through a UI also provided by the management and control server. The management and control server, in some embodiments, is a centralized controller, while in other embodiments it is a distributed controller with controller agents executing on devices in the SD-WAN (e.g., on the forwarding elements described below). In still other embodiments, the controller is a cloud gateway that performs the functionalities of a controller, or the controller and the cloud gateway share controller functionalities.

As shown, the visualization 100 includes a map 110 of the geographical area covered by the SD-WAN and being analyzed for potential modifications. Across the map 110, multiple applications 115 are distributed. In some embodiments, each application 115 represents a currently running application (i.e., an application known by the SD-WAN), while in other embodiments, each application 115 represents a potential application, and in still other embodiments, the applications 115 represent a combination of currently running applications and potential applications. It should be noted that while the visualization 100 is illustrated in black and white, other embodiments of the invention present the heat map using a variety of colors to distinguish between the different components of the heat map, as will be further described below. For instance, currently running applications and potential applications may be presented differently (e.g., different colors, different intensity of colors, different opacities, etc.), according to some embodiments.

In addition to the applications 115, the map 110 also includes a cloud gateway 120 (i.e., cloud gateway router) and multiple edge routers 130 connected to the cloud gateway 120 via links 140. The edge routers of some embodiments are edge machines (e.g., virtual machines (VMs), containers, programs executing on computers, etc.) and/or standalone appliances that operate at multi-computer locations of the particular entity (e.g., at an office or datacenter of the entity) to connect the computers at their respective locations to other elements (e.g., gateways, hubs, etc.) in the virtual network. In some embodiments, the elements are clusters of elements at each of the branch sites. In other embodiments, the edge elements are deployed to each of the branch sites as high-availability pairs such that one edge element in the pair is the active element and the other edge element in the pair is the standby element that can take over as the active edge element in case of failover.

An example of an entity for which such a virtual network can be established includes a business entity (e.g., a corporation), a non-profit entity (e.g., a hospital, a research organization, etc.), and an education entity (e.g., a university, a college, etc.), or any other type of entity. Examples of public cloud providers include Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc. In other embodiments, hubs can also be deployed in private cloud datacenters of a virtual WAN provider that hosts hubs to establish SD-WANs for different entities.

Branch sites (e.g., multi-user compute sites), in some embodiments, are locations that have multiple user computes and/or other user-operated devices and serve as source computers and devices for communicating with other computers and devices at other sites (e.g., other branch sites, datacenter sites, etc.). The branch sites, in some embodiments, can also include servers that are not operated by users. In some embodiments, a multi-machine site is a multi-tenant datacenter, such as a Software as a Service (SaaS) provider's datacenter. When the multi-tenant datacenter is a SaaS provider's datacenter, in some embodiments, the forwarding elements that provide access to the multi-tenant datacenter are multi-tenant gateway routers.

The cloud gateway router 120 (also referred to herein as a cloud gateway) in some embodiments is a forwarding element that resides in a private or public datacenter. The links 140 between the cloud gateway 120 and edge routers 130, in some embodiments, are secure connection links (e.g., tunnels). In some embodiments, multiple secure connection links (e.g., multiple secure tunnels that are established over multiple physical links) can be established between one edge router and a cloud gateway.

When multiple such links are defined between an edge router and a cloud gateway, each secure connection link in some embodiments is associated with a different physical network link between the edge router and an external network. For instance, to access external networks, an edge router in some embodiments has one or more commercial broadband Internet links (e.g., a cable modem, a fiber optic link) to access the Internet, an MPLS (multiprotocol label switching) link to access external networks through an MPLS provider's network, a wireless cellular link (e.g., a 5G LTE network), etc. In some embodiments, the different physical links between an edge router 130 and the cloud gateway 120 are the same type of links (e.g., are different MPLS links).

In some embodiments, one edge router 130 can also have multiple direct links (e.g., secure connection links established through multiple physical links) to another edge router, and/or to a datacenter hub router (not shown). Again, the different links in some embodiments can use different types of physical links or the same type of physical links. Also, in some embodiments, different edge routers at different branch sites connect (1) directly through one or more links, (2) through a cloud gateway or datacenter hub router to which one of the edge routers connects through two or more links, or (3) through another edge router of another branch site that can augment its role to that of a hub forwarding element.

The cloud gateway 120 in some embodiments is used to connect two SD-WAN forwarding elements (e.g., an edge router 130 and a forwarding element located in a same datacenter as one of the applications 115) through at least two secure connection links between the gateway 120 and the two forwarding elements at the two SD-WAN sites (e.g., a branch site and a datacenter site (not shown)). In some embodiments, the cloud gateway 120 also provides network data from one multi-machine site to another multi-machine site (e.g., provides the accessible subnets of one site to another site).

In some embodiments, each secure connection link between two SD-WAN forwarding elements (i.e., the cloud gateway 120 and the edge routers 130) is formed as a VPN tunnel (e.g., an overlay tunnel) between the two forwarding elements. Also, in some embodiments, secure connection links are defined between gateways in different public cloud datacenters to allow paths through the virtual network to traverse from one public cloud datacenter to another, while no such links are defined in other embodiments. Also, in some embodiments, the cloud gateway 120 is a multi-tenant gateway that is used to define other virtual networks for other entities (e.g., other companies, organizations, etc.). Some such embodiments use tenant identifiers to create tunnels between a gateway and edge router of a particular entity, and then use tunnel identifiers of the created tunnels to allow the cloud gateway to differentiate packet flows that it receives from edge forwarding elements of one entity from packet flows that it receives along other tunnels of other entities. In other embodiments, cloud gateways are single-tenant and are specifically deployed to be used by just one entity.

The heat map 100 is generated by the management and control server, in some embodiments, based on metrics collected from the various MFEs (e.g., cloud gateway 120 and edge routers 130) of the SD-WAN. In some embodiments, the management and control server receives (or collects) metrics from a compute machine designated for collecting metrics (also referred to herein as a discoverer node (DN)) and location context associated with data message flows in the SD-WAN from MFEs of the SD-WAN. In some embodiments, the metrics collected by the DN include quality of experience (QoE) metrics, such as loss rate, packet delay rate, packet jitter rate, and throughput. The DN, in some embodiments, uses the collected QoE metrics to compute multiple QoE scores associated with the data message flows, and provides these QoE scores to the management and control server. In some embodiments, the QoE scores specify traffic densities associated with the data message flows which can be used in conjunction with the heat map to identify modifications to make to the SD-WAN. In other embodiments, the DN provides additional metrics to the management and control server in conjunction with the QoE scores.

The heat map is used, in some embodiments, to identify issues within the SD-WAN and modifications to make to the SD-WAN to mitigate the identified issues and improve forwarding through the SD-WAN. For example, in some embodiments, the heat map can be used to identify modifications to improve forwarding for points of congestion, for locations having large clusters of destinations (e.g., locations where large amounts of applications are running) without any local MFEs to forward data message flows to the clusters, for specific applications that experience above-average amounts of traffic (e.g., amounts of traffic that exceed a specified traffic threshold), and for specific applications for which certain service requirements (e.g., latency requirements) have been specified. In some embodiments, the management and control server identifies the issues and modifications to mitigate the issues (e.g., based on policies and service rules defined for the SD-WAN by a network administrator) and implements these modifications. In other embodiments, a user (e.g., network administrator) uses the visualization 100 to identify issues in the SD-WAN and define modifications for the SD-WAN through the UI.

Figure 2:
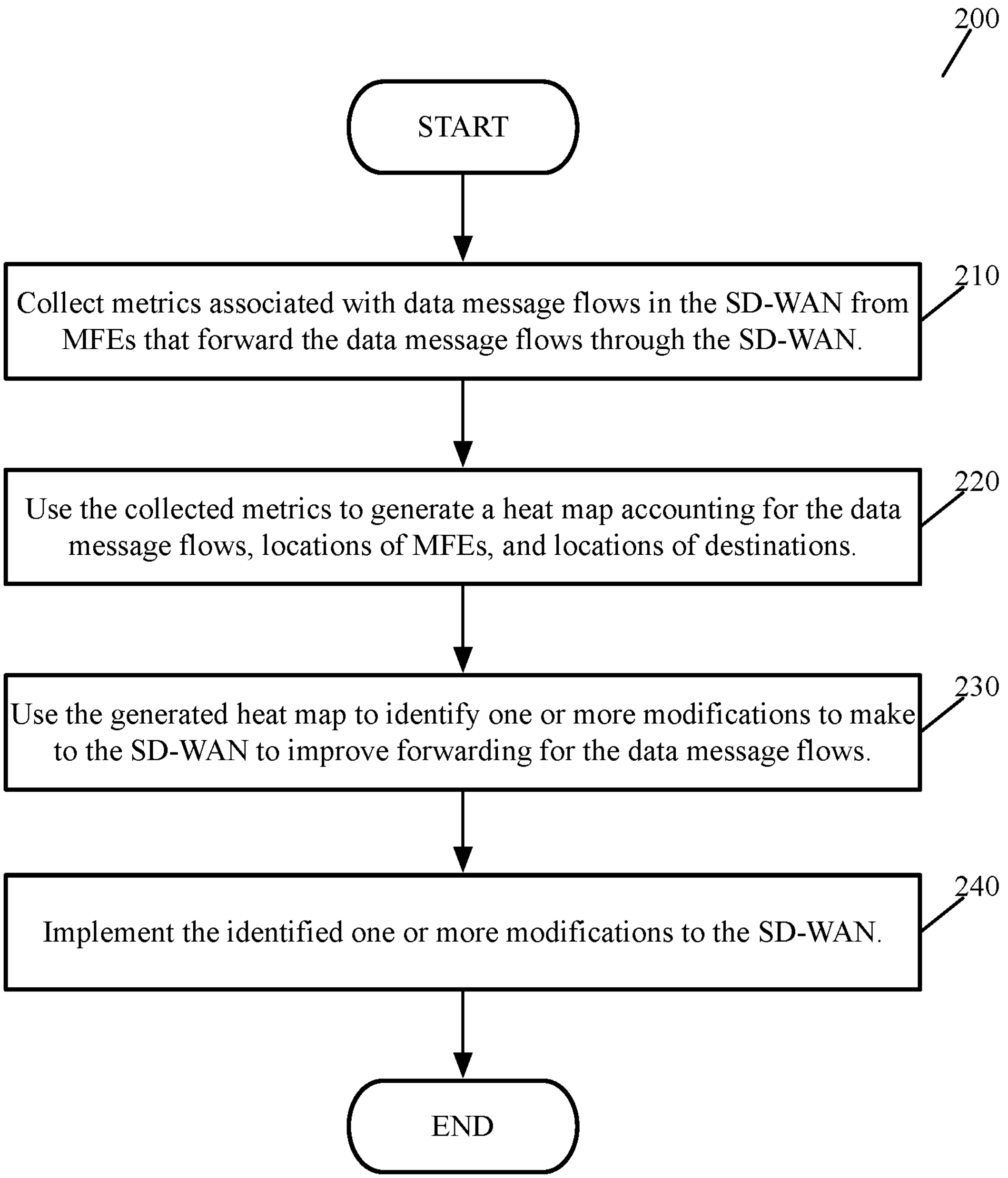
FIG. 2 conceptually illustrates a process of some embodiments for generating a heat map and using the generated heat map to identify and implement modifications.

FIG. 2, for example, conceptually illustrates a process 200 of some embodiments for generating a heat map and using the generated heat map to identify and implement modifications. In some embodiments, the process 200 is performed by a management and control server, while in other embodiments, the process 200 is performed by a combination of the management and control server and a user through a UI. The process 200 starts by collecting (at 210) metrics associated with the data message flows in the SD-WAN from MFEs that forward the data message flows through the SD-WAN.

In some embodiments, as mentioned above, the management and control server collects metrics from a DN that is designated for collected metrics from the MFEs of the SD-WAN, such as QoE metrics (e.g., packet loss rate, packet delay rate, packet jitter rate, throughput, etc.). The metrics collected from the DN, in some embodiments, include QoE scores computed by the DN. Alternatively or conjunctively, the collected metrics of some embodiments also include other scores computed by the DN, such as flow density data scores and bandwidth scores.

In some embodiments, the DN only collects metrics from cloud gateways, while in other embodiments, the DN collects metrics from all of the MFEs in the SD-WAN (i.e., cloud gateway routers, edge routers, and hub routers). For example, each cloud gateway in some embodiments is configured to profile a particular set of destinations to discover QoE for applications corresponding to the destinations and arrive at QoE metrics. The cloud gateways in some such embodiments export sets of application QoE metrics, including a list of the destinations (e.g., destination network addresses) to the DN. The management and control server of some embodiments maintains a registry of cloud providers having an appropriate cloud service availability along with associated policies. For example, VMware, Inc.'s VCO maintains a registry of cloud providers having VMware Cloud (VMC) service availability and associated policies.

The DN of some embodiments then begins probing for location context for a given destination list and arrives at a closest cloud provider having the appropriate cloud service available. In some embodiments, the DN uses established services to gather location context for the list of destinations. Examples of established services used in some embodiments include databases that provide contextual data for comprehensive IP address profiles, such as Maxmind and IPinfo.

The process 200 uses (at 220) the collected metrics to generate a heat map accounting for the data message flows, locations of MFEs, and locations of destinations. The visualization 100, for instance, includes representations of applications 115 distributed across the map 110 (i.e., destinations and locations of destinations), as well as representations of cloud gateway router 120 and edge routers 130. In addition to, or instead of, differentiating between known applications and potential applications, the representations of applications 115 in some embodiments may also be presented with varying degrees of intensity (e.g., color intensity) to differentiate between high traffic applications and low traffic applications.

The process 200 uses (at 230) the generated heat map to identify one or more modifications to make to the SD-WAN to improve forwarding for the data message flows. Examples of modifications, in some embodiments, include adding one or more cloud gateway routers or other forwarding elements (e.g., hub routers, edge routers acting as hub routers, etc.) to the SD-WAN, changing which cloud gateways and/or other forwarding elements are used to forward all or groups of certain flows, adding or changing which links are used for all or certain flows, etc.

For example, in some embodiments, a network administrator views a heat map that includes a visualization of a group of flows (e.g., file transfer flows) that are sent from the edge routers 130 and to a particular application located in Illinois via the cloud gateway router 120. Based on the heat map, and QoE metrics associated with the cloud gateway router 120 for the group of flows, the network administrator decides, in some embodiments, that one or more modifications are needed to improve forwarding for the group of flows (e.g., in order to meet a service-level agreement (SLA) associated with the group of flows).

A first potential modification that is identified to improve forwarding for the group of flows, in some embodiments, is to route the group of flows through a different next hop MFE. In some embodiments, the different next-hop MFE is a hub router (not shown) that is more geographically proximate to the particular application in Illinois than the cloud gateway router 120. In other embodiments, such as when there are no geographically proximate hub routers or other MFEs for the particular application, a new MFE (e.g., cloud gateway router) is provisioned near the particular application for forwarding the group of flows to and from the particular application.

In some embodiments, a second potential modification identified for the group of flows is to add hops to the route from the edge routers 130 to the particular application in Illinois to reduce the distance traversed between each hop. For instance, in some embodiments, an existing second MFE (e.g., a hub router (not shown) or second cloud gateway router (not shown)) is identified as a potential next-hop between the cloud gateway router 120 and the particular application to reduce the distance of the last mile connection. Alternatively, or conjunctively, in some embodiments, one or more cloud gateway routers (or other MFEs) are provisioned as additional next-hops between the cloud gateway router 120 and the particular application in Illinois to decrease the distance between each hop.

The identifications are made by the management and control server (e.g., based on policies and service rules defined for the SD-WAN) in some embodiments, and/or by a user (e.g., network administrator) through the UI provided by the management and control server. For instance, a user in some embodiments determines that a particular application or cluster of applications require their own respective cloud gateway for forwarding data message flows to and from the particular application or cluster, and subsequently provisions a cloud gateway to be deployed to a location near the particular application or cluster. In other embodiments, the management and control server determines that the number of hops between a set of source machines and a destination application should be reduced to improve QoE metrics, and generates a new forwarding rule for the flows between the set of source machines and destination application to bypass an intermediate MFE and reduce the number of hops.

The process 200 then implements (at 240) the identified one or more modifications to the SD-WAN. For instance, when a new cloud gateway is provisioned for the SD-WAN, the management and control server of some embodiments provides a set of forwarding rules defined for the new cloud gateway to edge routers of the SD-WAN to direct the edge routers to use the new cloud gateway to forward data messages according to the set of forwarding rules. In some embodiments, the set of forwarding rules may include a list of cloud gateways and, in some embodiments, specify to use the new cloud gateway for flows destined to a particular application, or, e.g., for flows destined to network addresses at a particular location or within a particular region. Following 240, the process 200 ends.

In some embodiments, the management and control server also sends out to the edge routers of the SD-WAN dynamic flow maps that include lists of destinations (e.g., IP addresses, ports, protocols, etc.) along with unique flow-group identifiers (e.g., unique universal identifiers (UUIDs)) and dynamic transit point information for dynamic transit points assigned for different flow-groups. The dynamic transit points, of some embodiments, are cloud gateways that forward data message flows through the SD-WAN. In some embodiments, each cloud gateway that is a dynamic transit point is registered with the management and control server as a dynamic transit gateway.

Each flow group, in some embodiments, is defined based on location-discovery performed by the DN and are identified by flow group identifiers, which are assigned to corresponding dynamic transit identifiers, in some embodiments. Also, in some embodiments, flow groups are defined based on one or more attributes associated with each flow in the flow group. In some embodiments, examples of such attributes include one or more of a destination address or set of destination addresses of the flows, a source address or set of source addresses of the flows, a certain category associated with the flows (e.g., VOIP (voice over IP), video conference, file transfer, etc.), etc.

Different flow groups are defined according to different attributes in some embodiments. For example, in some embodiments, a first flow group is defined based on layer 7 (L7) information, such as an application identifier (appID) that identifies the type of data (e.g., video, VOIP, etc.) contained in the payloads of the packets of the flows in the flow group, while a second flow group is defined based on L7 or contextual attributes (i.e., attributes other than L2-L4 header values) that identify a set of source applications from which the flows emanate (e.g., a particular video conference application or video streaming service application). To obtain such L7 attributes, some embodiments perform deep packet inspection at the edge devices, as further described below. Conjunctively, or alternatively, to using L7 attributes, some embodiments also define flow groups based on other L2-L4 header values and/or other non-L2 to L4 contextual attributes associated with the flows in the flow group.

The dynamic flow maps, in some embodiments, are each defined and formatted according to a five-tuple identifier corresponding to a particular destination, a flow group identifier assigned to a group of flows destined for the particular destination, and an identifier associated with a dynamic transit point through which the particular destination can be reached. The edge devices of some embodiments use software-defined routing to leverage the dynamic flow maps and forward application traffic toward the best available cloud gateway.

Each of the edge routers, in some embodiments, processes the received dynamic flow maps and installs special aggregated routes based on the flow-group UUIDs that are uniquely associated with dynamic transit gateway identifiers as next-hop logical identifiers. As flows are received at the edge devices, each edge device performs a flow-map check, in some embodiments, and identifies a flow group associated with a received flow. For example, in some embodiments, each edge device collects attributes from received packets and uses the collected attributes to perform the flow-map check to identify the associated flow group. As described above, each flow group is defined, in some embodiments, based on one or more attributes, and as such, each edge device of some embodiments collects attributes from each received packet to identify the flow group associated with the packet. In some embodiments, each edge device includes a deep packet inspector for performing deep packet inspection (DPI) on received packets to extract and collect contextual attributes (e.g., L7 attributes) for use in performing the flow-map check.

In some embodiments, once an edge device has identified a flow group corresponding to the received packet, and the UUID associated with the identified flow group, the edge device performs a special aggregated route lookup action to identify a route based on the UUID associated with the identified flow group. The edge device of some embodiments then uses a logical identifier of the dynamic transit gateway corresponding to the flow group UUID to route the received flow (e.g., by sending the traffic on an overlay tunnel associated with the dynamic transit gateway), according to some embodiments.

Figure 3:
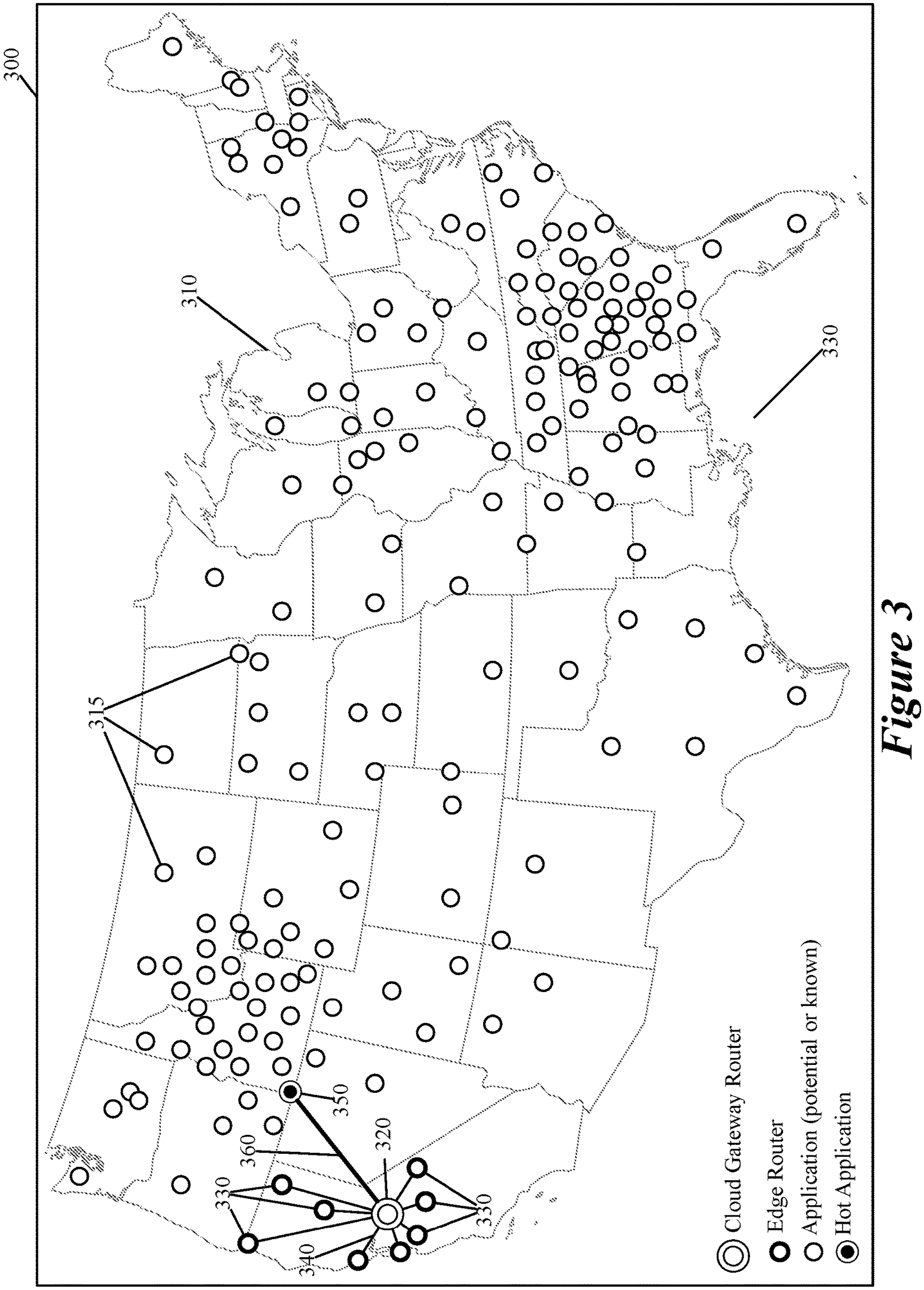
FIG. 3 illustrates a visualization of the heat map of some embodiments in which a hot application is identified.

FIGS. 3-9 illustrate additional example visualizations of a heat map for an SD-WAN, in some embodiments. FIG. 3 illustrates a visualization 300 of the heat map in which a hot application 350 is identified. Hot applications, in some embodiments, are applications that receive higher than threshold amounts of traffic. Also, in some embodiments, hot applications can include applications of a particular category (e.g., video conference applications). Moreover, the heat map might display a hot region, which is a region that has a large number of other applications (e.g., a dense application cluster). Like the visualization 100, the visualization 300 includes a map 310 of the geographic area spanned by the SD-WAN, representations of applications 315 distributed across the map 310, a cloud gateway 320, and multiple edge routers 330 connected to the cloud gateway 320 by links 340.

As shown, the cloud gateway 320 connects the edge routers 330 to at least the hot application 350 via one or more links 360. While illustrated as a direct link between the cloud gateway 320 and the hot application 350, the one or more links 360 connect the cloud gateway 320 to, e.g., an edge router for a datacenter hosting a server that runs the hot application 350, according to some embodiments. In this example, the hot application 350 is a SaaS application hosted by a third-party datacenter (not shown) and the links 360 are unmanaged links. In other embodiments, the hot application 350 is an SD-WAN application that runs on a server belonging to the entity for which the SD-WAN is implemented and the links 360 are managed links.

Figure 4:
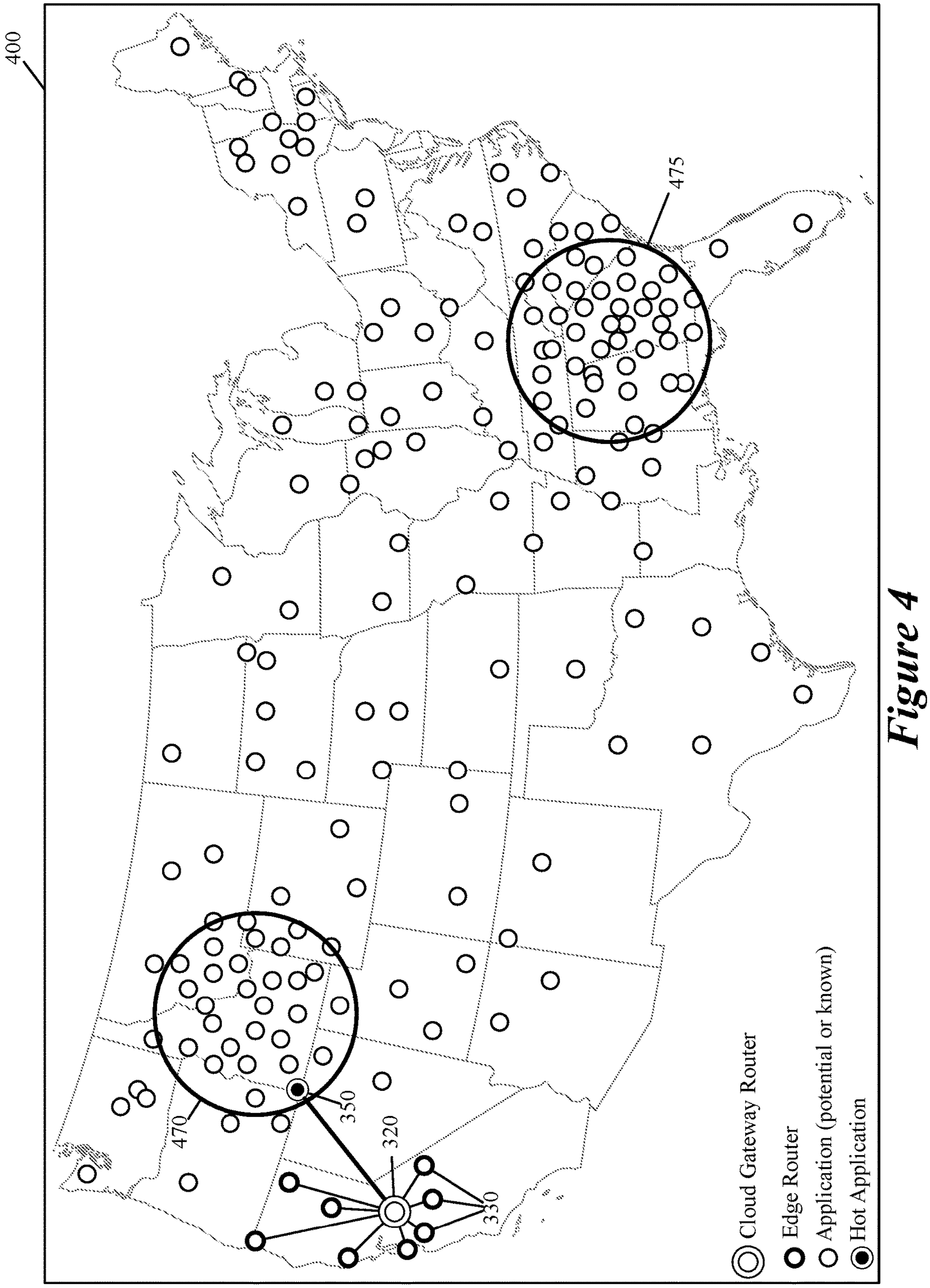
FIG. 4 illustrates a visualization of some embodiments in which destination clusters (i.e., groups of geographically proximate applications) have been identified.

FIG. 4 illustrates a visualization 400 in which destination clusters (i.e., groups of geographically proximate applications) have been identified. The location context (e.g., location context gathered by the DN described above) is used, in some embodiments, to identify larger groups of destinations (e.g., using methods like clustering). As shown, two destination clusters 470 and 475 have been identified, with the hot application 350 located within the destination cluster 470. The center points (centroids) of the destination clusters 470 and 475, in some embodiments, are identified and marked using algorithms, such as Gaussian Mixture Methods (GMM), or using local density estimators, such as DBSCAN. While two clusters are identified in the visualization 400, other embodiments may include additional or fewer destination clusters than illustrated.

In some embodiments, an application may be relocated, while maintaining the same destination network address. The application is relocated, in some embodiments, when a server machine (e.g., a virtual machine (VM) or Pod) on which the application executes is migrated to a new location. In other embodiments, a new server machine is deployed at the new location and configured like the prior server machine on which the application executed. To relocate the application to the server machine at the new location, a new instance of the application is deployed to the new server machine, in some embodiments, and configured in the same way as the previous instance of the application.

Figure 5:
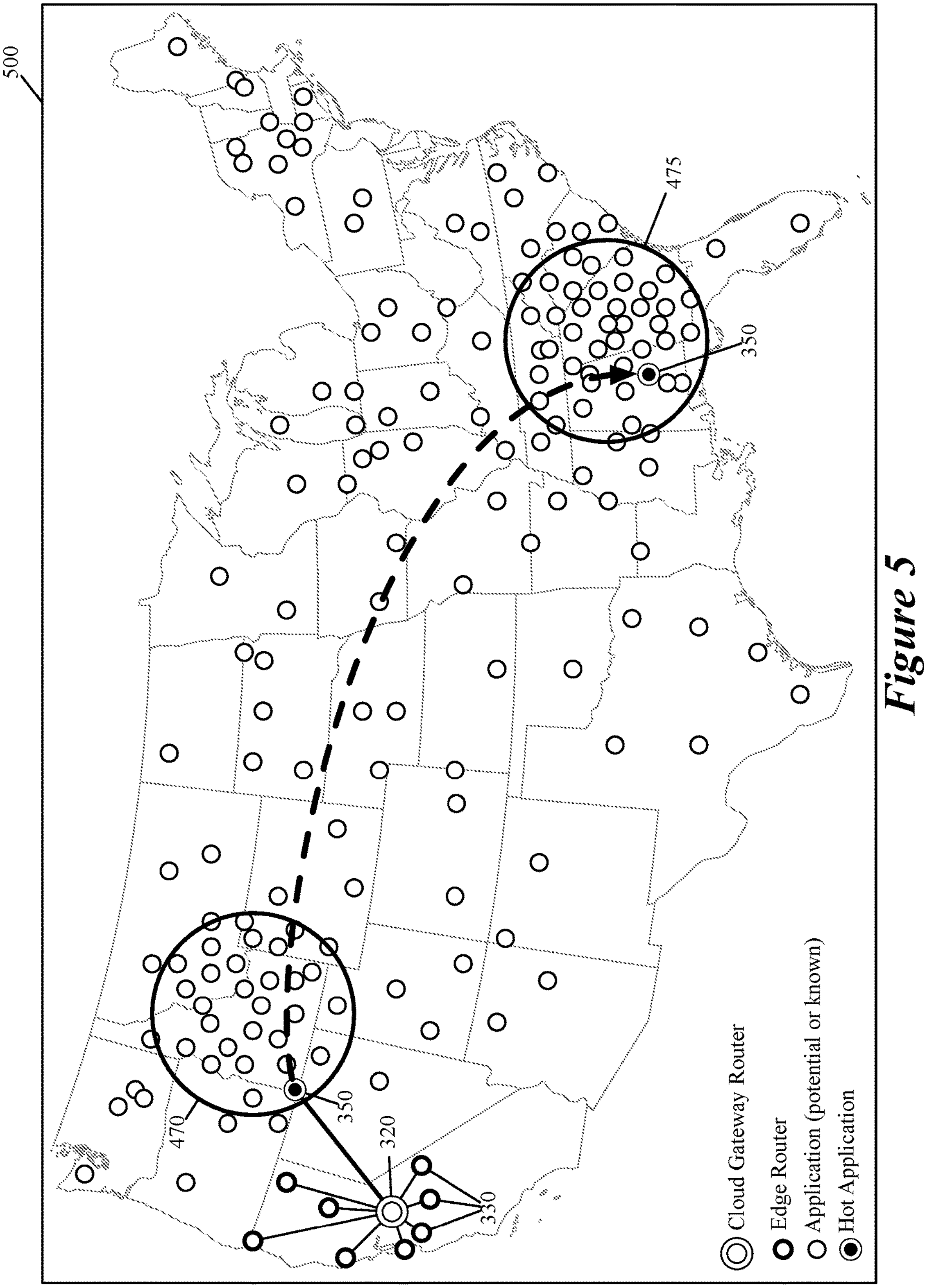
FIG. 5 illustrates a visualization of some embodiments in which the hot application is relocated from its initial location within a first destination cluster to a location within a second destination cluster.

For instance, FIG. 5 illustrates a visualization 500 in which the hot application 350 is relocated from its initial location within the destination cluster 470 to a location within the other destination cluster 475. As shown, the cluster 470 is much more geographically proximate to the cloud gateway 320 than the cluster 475. However, the edge routers 330 are still configured to forward data messages to the hot application 350 using the cloud gateway 320. As a result, data message flows sent between the cloud gateway 320 and the hot application 350 have a longer distance to travel before reaching their destination.

Figure 6:
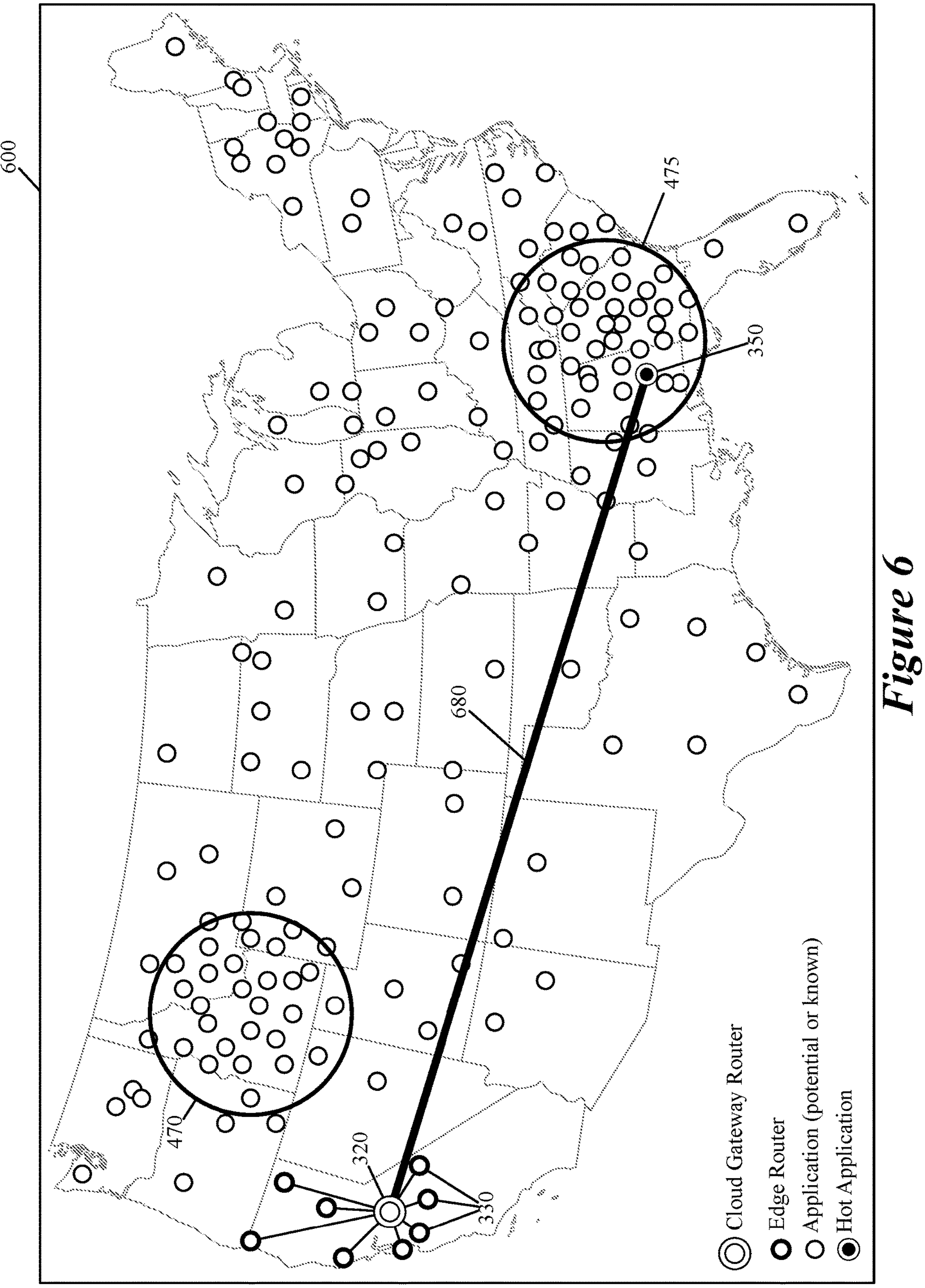
FIG. 6 illustrates the visualization of some embodiments after the hot application has been relocated to a location within the second destination cluster.

FIG. 6, for example, illustrates the visualization 600 after the hot application 350 has been relocated to a location within the destination cluster 475. The last mile connectivity 680 from the cloud gateway 320 to the hot application 350 at its new location covers a much longer distance than the last mile connectivity (i.e., links 360) before the hot application 350 was relocated. Due to the increased distance, some embodiments experience networking issues that affect QoE for users, such as increased latency. As such, some embodiments use the heat map to identify potential locations for dynamic transit points (e.g., additional cloud gateways) for reaching the hot application 350, and, in some embodiments, for reaching some or all of the other applications located in and around the destination cluster 475.

In some embodiments, additional dynamic transit points are required to reach the hot application 350 based on service requirements associated with the hot application 350. Additional dynamic transit points are also required, in some embodiments, for other applications (e.g., applications that receive less than a threshold amount of traffic), as well as hot applications that have not been relocated. For example, in some embodiments an application is associated with a low latency requirement, and thus a cloud gateway that is geographically proximate to the application is required to ensure that the low latency requirement is met. In some embodiments, using the cloud gateway that is closer to the application may result in a longer round-trip time (RTT) for reaching the application compared to an RTT associated with using a cloud gateway that is farther from the application but closer to the source edge router. In some such embodiments, the longer RTT is preferable due to the lower latency of the last mile connection to the application.

Figure 7:
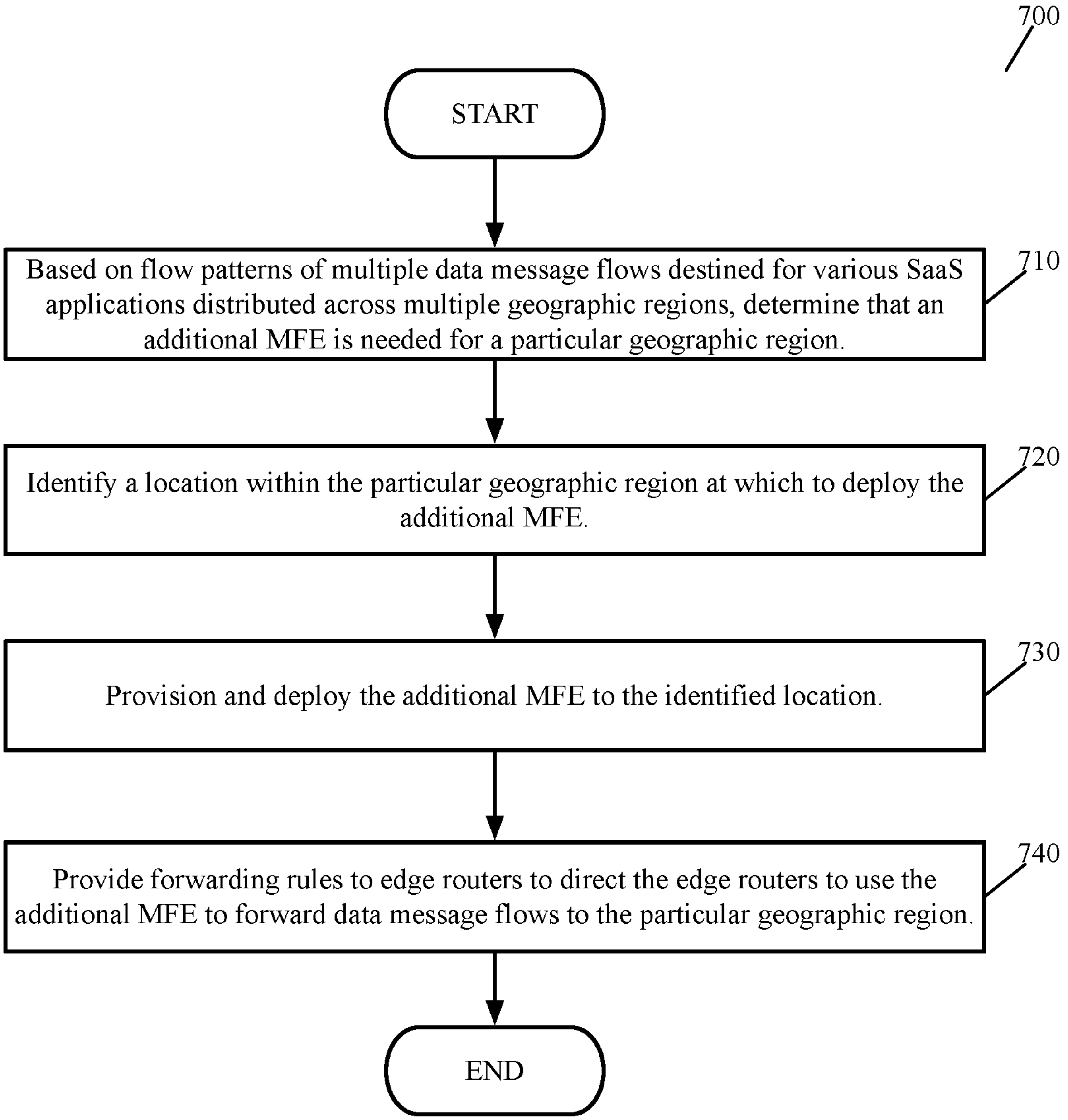
FIG. 7 conceptually illustrates a process performed in some embodiments for provisioning a new cloud gateway router for use in reaching an application or application cluster.

FIG. 7 conceptually illustrates a process 700 performed in some embodiments for provisioning a new cloud gateway router for use in reaching an application or application cluster. The application or application cluster, in some embodiments, can include applications in remote locations, such as the two applications shown within the boundaries of Minnesota in the visualizations of the map 110, as well as the destination cluster 475 before or after the application 350 is relocated. The process 700 is performed in some embodiments by a management and control server for the SD-WAN.

The process 700 starts when, based on flow patterns of multiple data message flows destined for various SaaS applications distributed across multiple geographic regions, the process determines (at 710) that an additional MFE is needed for a particular geographic region. As discussed above, after the hot application 350 is relocated, an additional dynamic transit point (e.g., cloud gateway) is needed to reach the hot application at its new location. In other embodiments, an application or application cluster may require a new cloud gateway based on a determination that there are no cloud gateways near the application or application cluster. In some such embodiments, as also mentioned above, one or more applications may be associated with service requirements that can only be met by provisioning a local cloud gateway for the application or application cluster.

Figure 8:
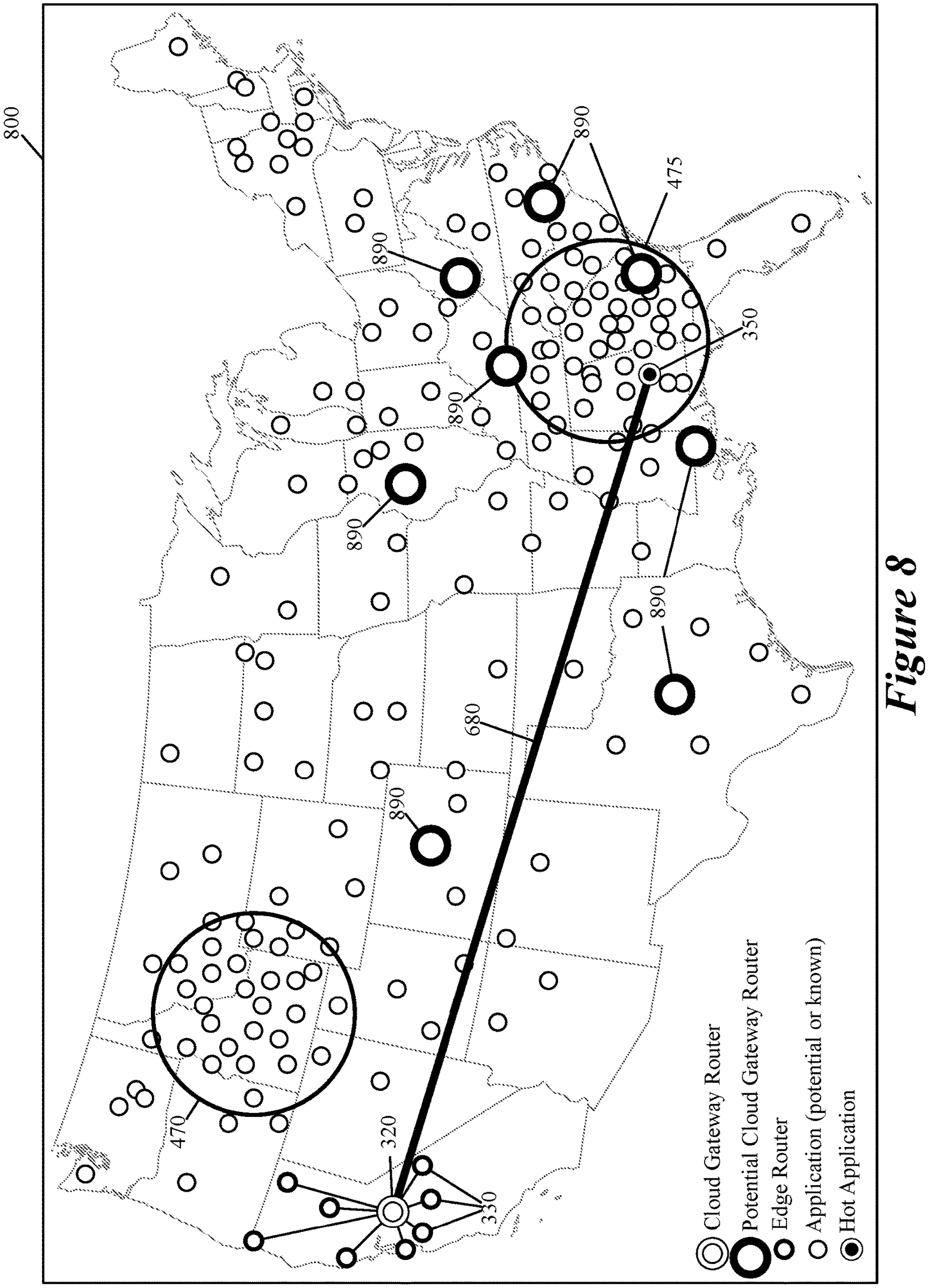
FIG. 8 illustrates a visualization of some embodiments of the heat map after potential locations for cloud gateway routers have been identified.

The process 700 identifies (at 720) a location within the particular geographic region at which to deploy the additional MFE. FIG. 8, for instance, illustrates a visualization 800 of the heat map after potential locations for cloud gateway routers have been identified. As shown, eight (8) potential locations for cloud gateway routers 890 (i.e., dynamic transit points) have been identified and presented on the heat map.

In some embodiments, proximity scoping is utilized by the cloud gateway 320 or the management and control server for the SD-WAN to identify the potential locations for dynamic transit points. Tools such as MyTraceroute (MTR) are used, in some embodiments, to trace lossy network segments and find the potential locations. Capacitated P-center algorithms are also employed, in some embodiments, to identify optimal locations for such dynamic transit points. In some embodiments, centroids with lossy network segments are added to the destination clusters 470 and 475. Also, in some embodiments, available edge-compute stacks (i.e., existing MFE instances) that are close to the identified potential locations are added to a set of edge-compute stacks. The management and control server of some embodiments selects a location from the identified potential locations based on QoE scores associated with the locations.

The process 700 then provisions and deploys (at 730) the additional MFE to the identified location. The management and control server of some embodiments registers with a controller service in a cloud provider that is in proximity with SaaS applications in the identified location. In some embodiments, the steps to allocate transit points are as follows. First, identified centroids of application clusters (e.g., destination clusters 470 and 475) are added to a set, $C_k$, where C represents the set of clusters and k represents the number of identified clusters. For $C_k$, a set of transit points, $T_m$, closest to the clusters is selected, where T is the set of transit points and m is the number of selected transit points (i.e., a number of transit points in a set of M transit points). Optimal transit points are then located by applying the capacitated P-center method as mentioned above, and then assigned to edge routers given $E_n$, wherein E is the set of edges and n is the number of edges in a set of N edges, $x_{n,m,k}$ is the estimated utilization (i.e., load) of accessing $C_k$ via $T_m$ from $E_n$, $L_m$ is the maximum load of $T_m$, $l_m$ is the current load of m, and $Q_n$ is the maximum number of transit points that can be assigned to an edge router n.

Using the above, the objective is to determine maximum utilization and allocation of transit points, $W=\Sigma n \Sigma m \Sigma k\ x_{n,m,k}*X_{n,m}+\Sigma m\ l_m Y_m$, where: $X_{n,m}$ is 1 if m is selected for n, or 0 otherwise; and $Y_m$ is 1 if m is deployed, or 0 otherwise. This objective is subject to a set of caveats. For instance, the total assigned transit points cannot exceed the maximum transit points M, the sum of the estimated total load and current load of a transit point cannot exceed the maximum load of trans point $L_m$, and the number of transit points assigned to an edge n cannot exceed the maximum allowed number of transit points per edge $Q_n$. Additionally, the specified integrality constraints include $X_{m,n}$ is equal to 0,1 for any/all m,n; and $Y_m$ is equal to 0,1 for any/all m.

In some embodiments, the management and control server provisions gateways by triggering a gateway template-based auto-provisioning and activating the gateway instances. The template-based auto-provisioning, in some embodiments, is API-based and provides an automated solution for hosting gateways on target cloud providers (e.g., AWS, GCP, Microsoft Azure, etc.). Once the gateway has been provisioned, the gateway is registered with the management and control server as a dynamic transit gateway, in some embodiments. The management and control server of some embodiments receives metrics (e.g., QoE scores) associated with provisioned dynamic transit gateways and compares these metrics with metrics received before the dynamic transit gateways were provisioned in order to identify improvements. In some embodiments, the management and control server performs auto-scaling out and decommissioning of dynamic transit gateways (e.g., when flow densities fall below established thresholds).

Once the additional MFE has been provisioned and deployed, the process 700 provides (at 740) forwarding rules to edge routers to direct the edge routers to use the additional MFE to forward data message flows to the particular geographic region. In some embodiments, the forwarding rules may specify a particular application or set of applications for which the additional MFE is to be utilized, while all other data message flows to other applications not specified by the rules are to be forwarded using, e.g., a default MFE, even when the other applications are in the same region as the specified particular application or set of applications.

Figure 9:
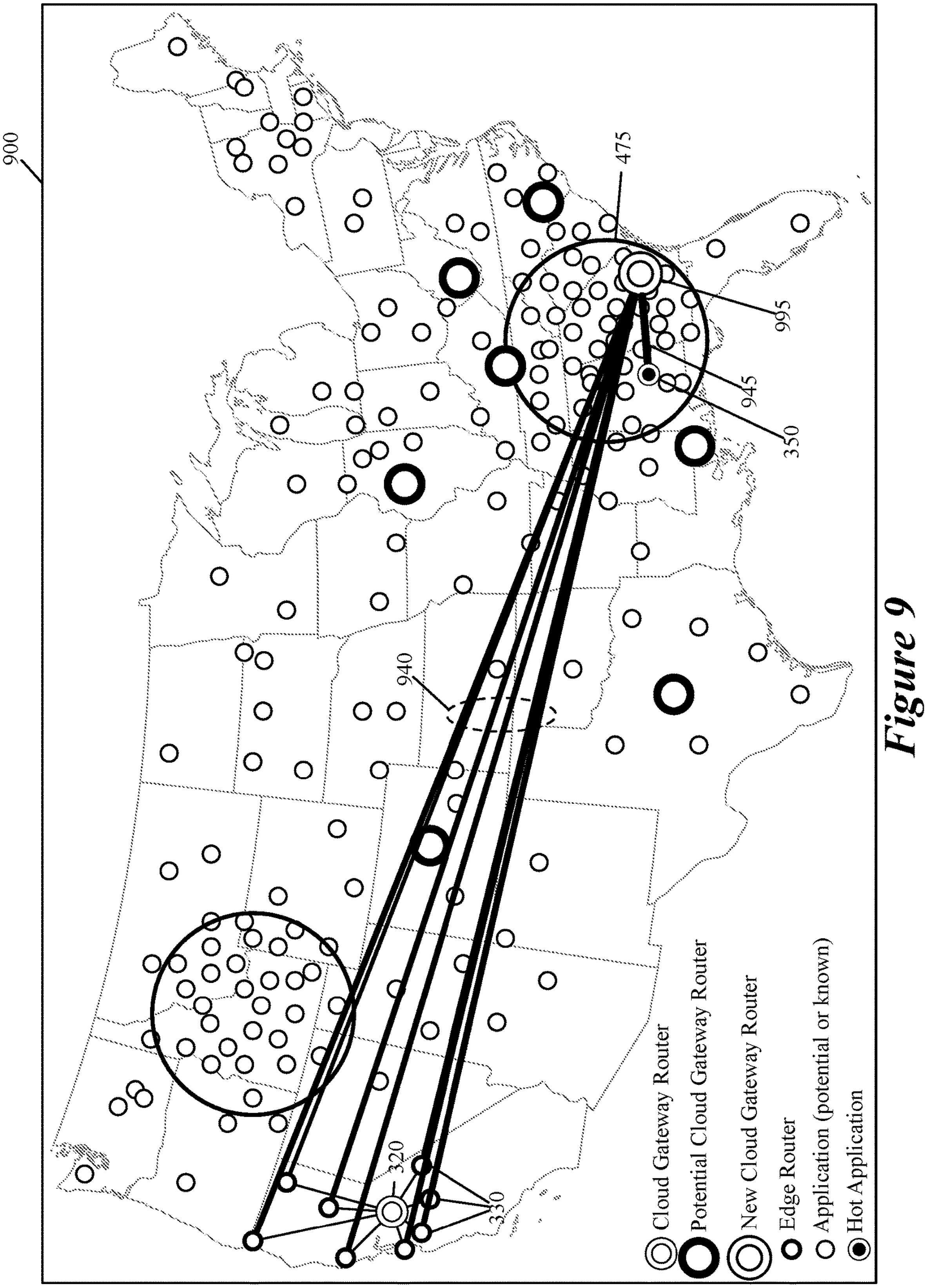
FIG. 9 illustrates a visualization of some embodiments in which a particular location for new cloud gateway has been selected for the edge routers to use to reach the hot application at its new location.

FIG. 9 illustrates a visualization 900 in which a particular location for new cloud gateway 995 has been selected for the edge routers to use to reach the hot application at its new location. As shown, the edge routers 330 have connections 940 to the new cloud gateway 995, which has a significantly shorter last mile connection 945 to the hot application 350. In some embodiments, after deploying the new cloud gateway 995, the management and control server provides forwarding rules to the edge routers to direct the edge routers to use the new cloud gateway 995 for all flows to applications in and around the cluster 475. In other embodiments, the management and control server provides forwarding rules to direct the edge routers to use the new cloud gateway 995 only for flows destined for the hot application 350, and to use the existing cloud gateway 320 for each other flow to the region.

In some of these embodiments, the management and control server also provides new forwarding rules, records, and/or configuration data to the new cloud gateway 995 to direct the new cloud gateway 995 to properly forward flows (e.g., a list of service IP addresses for the service applications, data for setting up tunnels to the computers and/or machines on which the applications execute or to their associated forwarding elements, etc.) received from the edge routers 330 to applications that are running in datacenters in Georgia and one or more neighboring states (e.g., applications in and around the destination cluster 475). Returning to the process 700, following 740, the process ends.

In some embodiments, the DN continues to compute QoE scores from QoE metrics collected from MFEs of the SD-WAN after modifications to the SD-WAN have been made. From the DN, the management and control server collects the computed QoE scores and, in some embodiments, compares these scores against previously collected QoE scores to identify and highlight improvements resulting from the SD-WAN modification(s). In some embodiments, dynamic transit gateways are monitored and, when flow densities drop below established threshold values, in some embodiments, the dynamic transit gateways are auto-scaled and decommissioned.

In several embodiments described above, a new cloud gateway is deployed in a region for reaching a hot application that is relocated to the region (e.g., the cloud gateway 995 that is deployed for reaching the hot application 350 that is relocated from destination cluster 470 to destination cluster 475). In some embodiments, a network administrator can use a heat map to deploy a new cloud gateway even when no applications have relocated, e.g., to deploy the new cloud gateway in a region for applications that currently operate in that region or nearby regions. The following two examples are illustrative of such a use of a heat map.

As a first example, a network administrator of some embodiments views a heat map to identify destination clusters in one region (e.g., destination cluster 475 in the south) being accessed by computing devices in SD-WAN connected sites in another region (e.g., by machines connected to the edge routers 330 in California) through a cloud gateway that is deployed in the other region near the computing devices (e.g., the cloud gateway 320 in California). After noticing this, the network administrator of some embodiments can then decide to deploy a cloud gateway (e.g., a cloud gateway 995 in Georgia) closer to the destination cluster to decrease the distance of the last mile connection to the destination cluster.

Another example involves a network administrator viewing the heat map to identify hot applications located in sparsely, or relatively sparsely, server populated regions (e.g., the two applications located within the bounds of Minnesota on the map 110) that are being frequently accessed by computing devices in SD-WAN connected sites located in other regions (e.g., the machines connected to the edge routers 330 in California) through a cloud gateway located in said other regions (e.g., the cloud gateway 320 in California). After viewing the heat map and identifying such hot applications, the network administrator can decide to deploy a cloud gateway (e.g., a cloud gateway in a public or private cloud datacenter in Minnesota) closer to the identified hot applications so that there is at least one geographically proximate cloud gateway for reaching the hot applications in order to shorten the last mile connectivity to the hot applications.

Additionally, while the embodiments described above provide examples in which a single cloud gateway router is provisioned to improve forwarding, in other embodiments, two or more cloud gateway routers are provisioned to improve forwarding. For example, in some such other embodiments, a first cloud gateway router is provisioned for forwarding flows identified as hot flows, while a second cloud gateway router is provisioned for forwarding all other flows for a particular region. In still other embodiments, one or more additional cloud gateway routers are provisioned to, e.g., decrease the load for an existing cloud gateway router that forwards flows to and from, e.g., a dense destination cluster.

Figure 10:
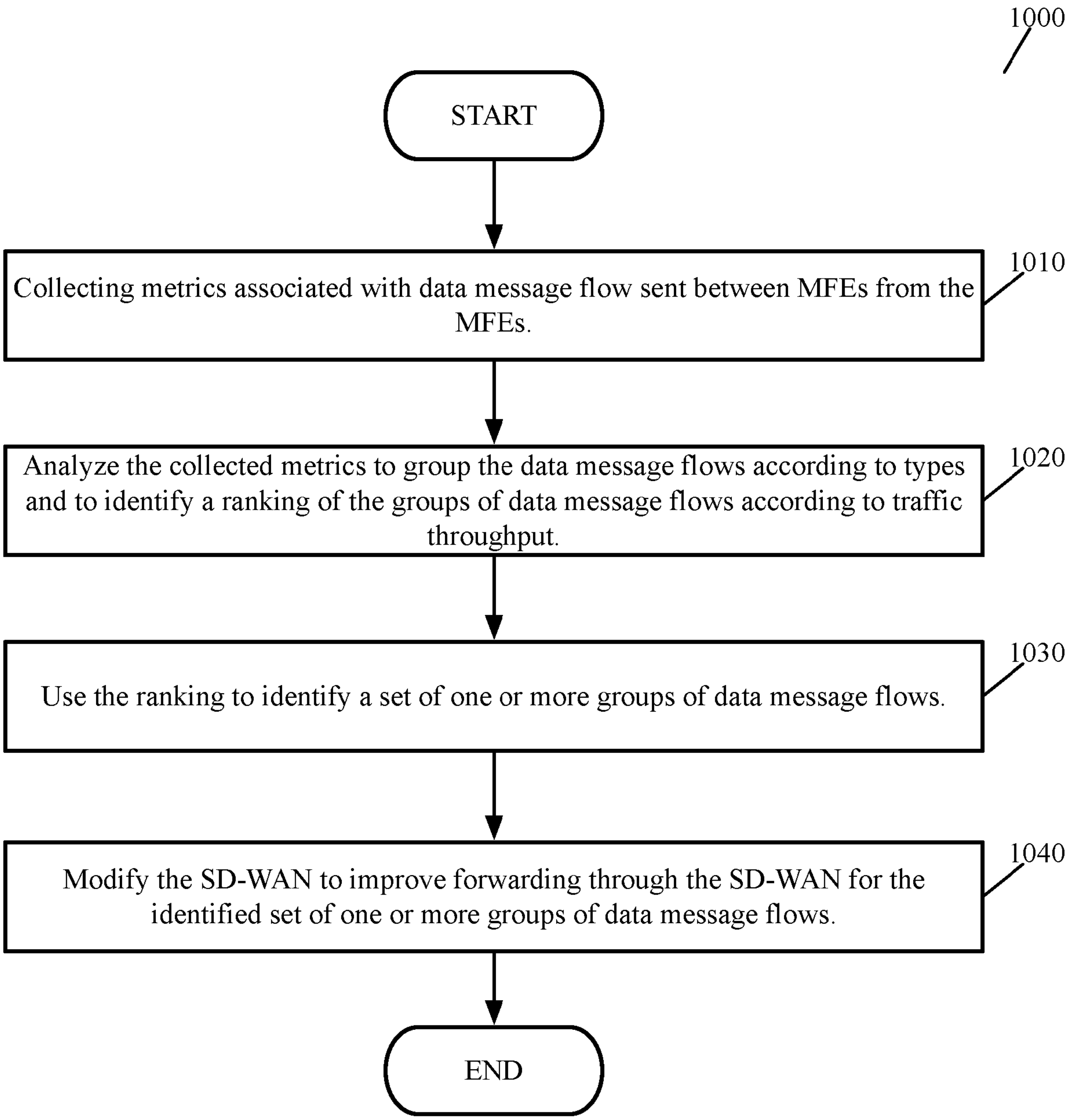
FIG. 10 conceptually illustrates a process performed in some embodiments to modify the SD-WAN to improve forwarding for one or more flows determined to be hot flows (e.g., flows destined for hot applications).

FIG. 10 conceptually illustrates a process 1000 performed in some embodiments to modify the SD-WAN to improve forwarding for one or more flows determined to be hot flows (e.g., flows destined for hot applications). The process 1000 is performed in some embodiments by the management and control server for the SD-WAN. The process 1000 starts when the management and control server collects (at 1010) metrics associated with data message flows sent between MFEs from the MFEs. As discussed above, the management and control server of some embodiments collects QoE metrics from a DN that is designated for collected metrics from the MFEs of the SD-WAN. In some embodiments, each cloud gateway is configured to profile a particular set of destinations to discover QoE for applications corresponding to the destinations and arrive at QoE metrics, which are then collected by (or exported to) the DN.

The process 1000 analyzes (at 1020) the collected metrics to group the data message flows according to types and to identify a ranking of the groups of data message flows according to traffic throughput. In some embodiments, data message flows with high packet rate are defined as hot flows. The hot flows, in some embodiments, also include flows destined for hot applications, and/or include flows from a particular hot source or set of sources that send a lot of packets. In still other embodiments, hot flows include flows belonging to a certain category (e.g., video conference flows, VOIP flows, etc.). In yet other embodiments, hot flows are defined as all, or any combination of, the aforementioned hot flows.

The process 1000 uses (at 1030) the ranking to identify a set of one or more groups of data message flows. For instance, the ranking may group flows based on maximum and minimum thresholds for throughput (i.e., packet rate), and identify the top N groups to include in the set of one or more groups of data message flows. In some embodiments, the identified set of one or more groups will be designated as the hot flows for which modifications to the SD-WAN will be made.

Figure 11:
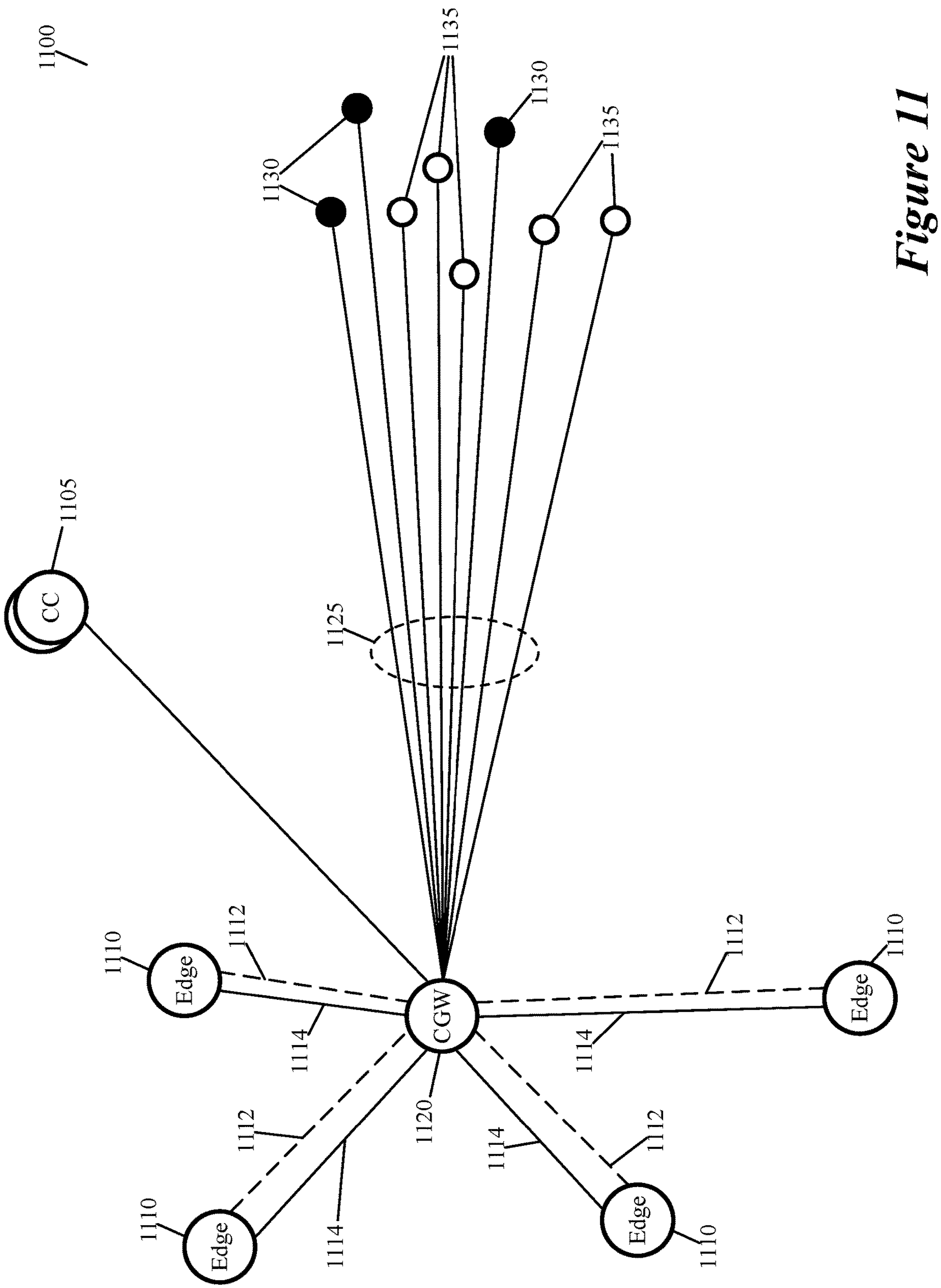
FIG. 11 conceptually illustrates a diagram showing a cloud gateway that provides connections for a set of edge routers to a set of applications.

Ranking flows based on their "hotness" will now be described by reference to FIG. 11, which conceptually illustrates a diagram 1100 showing a cloud gateway that provides connections for a set of edge routers to a set of applications. Each of the edge routers 1110 respectively includes two secure connection links 1112 and 1114 to connect to the cloud gateway router 1120. The links 1112 are commercial broadband Internet links (e.g., a cable modem, a fiber optic link), while the links 1114 are optimized MPLS (multiprotocol label switching) links. In some embodiments, each link 1112 and 1114 includes multiple links. The cloud gateway router 1120 connects to the applications 1130 and 1135 via links 1125. The links 1125 are managed links in some embodiments, unmanaged links in other embodiments, and a combination of managed and unmanaged links in still other embodiments.

In this example, the applications 1130 are ranked and defined as hot applications (e.g., applications that receive more than a threshold amount of traffic) while the applications 1135 are applications that experience average amounts of traffic (e.g., applications that receive less than a threshold amount of traffic). As such, the flows that are destined to the hot applications 1130 will be hot flows that will have higher rankings (at 1030) while the flows that are destined to the non-hot applications 1135 will be non-hot flows that will have lower rankings (at 1030).

Returning to the process 1000, the process modifies (at 1040) the SD-WAN to improve forwarding through the SD-WAN for the identified set of one or more groups of data message flows. For instance, in the diagram 1100, in some embodiments, based on metrics collected from the cloud gateway 1120, the controller cluster 1105 provides new or updated forwarding rules to the cloud gateway for distribution to the edge routers 1110 to direct the edge routers 1110 to use the links 1112 when forwarding data message flows associated with the non-hot applications 1135, and to use the links 1114 when forwarding data message flows associated with the hot applications 1130 (i.e., the set of hot flows). In other embodiments, other modifications to the SD-WAN are implemented to improve forwarding for the hot flows, such as adding links (e.g., adding fiber links) between the edge routers and cloud gateway, deploying one or more additional cloud gateways designated for forwarding hot flows, etc. Following 1040, the process 1000 ends.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
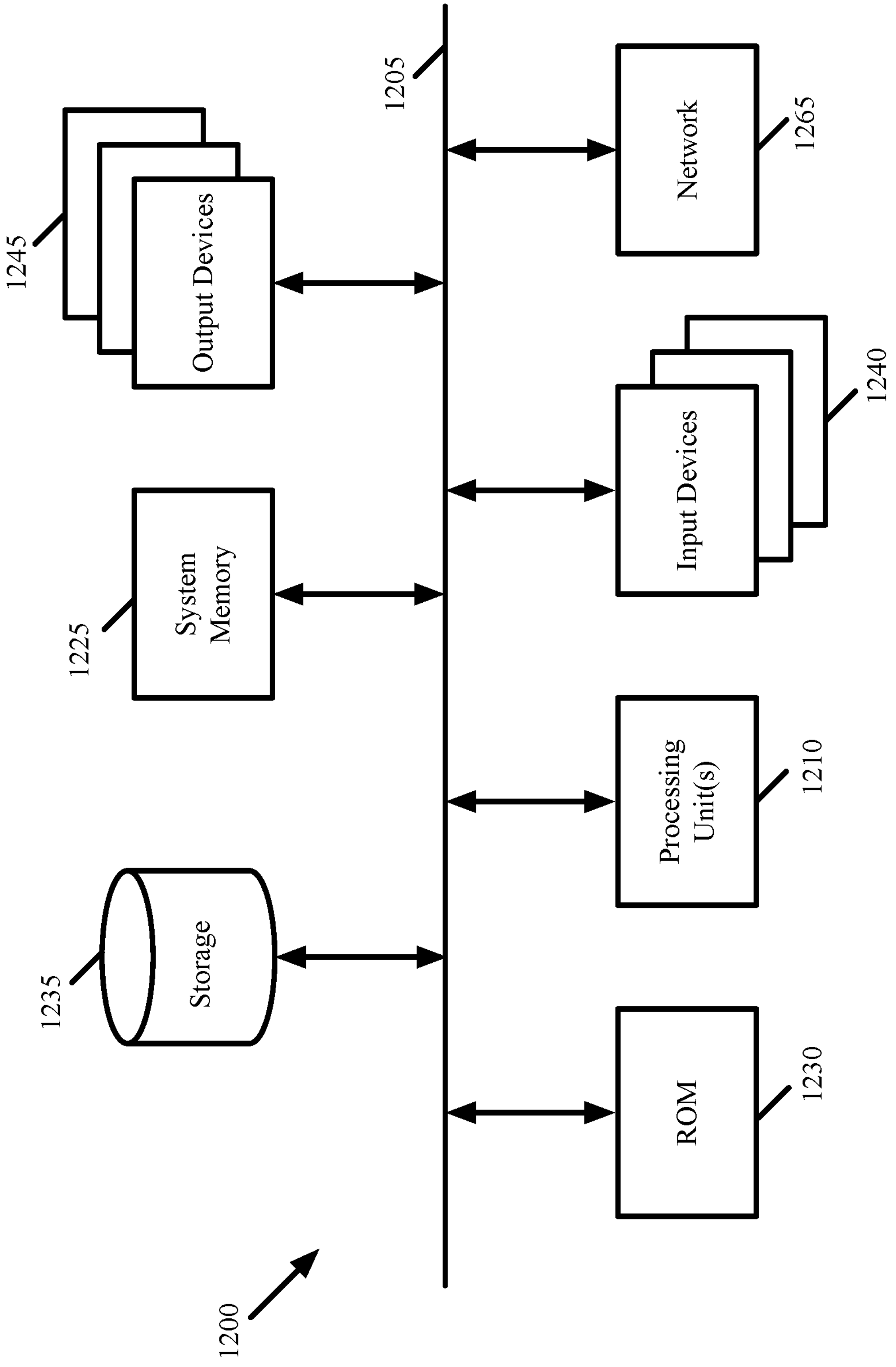
FIG. 12 conceptually illustrates a computer system with which some embodiments of the invention are implemented.

FIG. 12 conceptually illustrates a computer system 1200 with which some embodiments of the invention are implemented. The computer system 1200 can be used to implement any of the above-described hosts, controllers, gateway, and edge forwarding elements. As such, it can be used to execute any of the above described processes. This computer system 1200 includes various types of non-transitory machine-readable media and interfaces for various other types of machine-readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) 1210 may be a single processor or a multi-core processor in different embodiments. The read-only-memory (ROM) 1230 stores static data and instructions that are needed by the processing unit(s) 1210 and other modules of the computer system 1200. The permanent storage device 1235, on the other hand, is a read-and-write memory device. This device 1235 is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory 1225 is a volatile read-and-write memory, such as random access memory. The system memory 1225 stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices 1240 enable the user to communicate information and select commands to the computer system 1200. The input devices 1240 include alphanumeric keyboards and pointing devices (also called "cursor control devices"). The output devices 1245 display images generated by the computer system 1200. The output devices 1245 include printers and display devices, such as cathode ray tubes (CRT) or liquid crystal displays (LCD). Some embodiments include devices such as touchscreens that function as both input and output devices 1240 and 1245.

Finally, as shown in FIG. 12, bus 1205 also couples computer system 1200 to a network 1265 through a network adapter (not shown). In this manner, the computer 1200 can be a part of a network of computers (such as a local area network ("LAN"), a wide area network ("WAN"), or an Intranet), or a network of networks (such as the Internet). Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of using a heat map to modify an SD-WAN (software-defined wide-area network) infrastructure deployed for a set of geographic locations, the method comprising:

from a set of managed forwarding elements (MFEs) that forward a plurality of data message flows through the SD-WAN infrastructure to a set of destination clusters, collecting a plurality of metrics associated with the plurality of data message flows;

based on the collected plurality of metrics, generating a heat map that accounts for (i) the plurality of data message flows, (ii) locations of respective MFEs from among the set of MFEs, and (iii) locations of respective destination clusters from among the set of destination clusters, wherein the heat map is configured to group destinations of the plurality of data message flows into the set of destination clusters based on geographic proximity of the destinations to each other, the respective destination clusters corresponding to respective groups of applications, and wherein the heat map is configured to provide a visualization of a geographical area covered by the SD-WAN infrastructure, the respective groups of applications being distributed across the heat map; and using the generated heat map to identify at least one modification to make to the SD-WAN infrastructure to improve forwarding of the plurality of data message flows to the respective groups of applications distributed across the heat map.

2. The method of claim 1, wherein the respective groups of applications comprise respective groups of Saas (software as a service) applications.

3. The method of claim 1, wherein using the generated heat map to identify at least one modification to make to the SD-WAN infrastructure to improve forwarding of the plurality of data message flows comprises:

identifying from the heat map a particular destination cluster from among the set of destination clusters at a particular location that does not include an MFE for forwarding data message flows to and from the particular destination cluster; and deploying a new MFE to the particular location to improve forwarding to and from the particular destination cluster.

4. The method of claim 1, wherein using the generated heat map to identify at least one modification to make to the SD-WAN infrastructure to improve forwarding of the plurality of data message flows comprises:

using the heat map to identify one or more locations of one or more destination clusters in the set of destination clusters experiencing congestion; and for each identified location, deploying a new MFE to the location to improve forwarding of the plurality of data message flows.

5. The method of claim 1, wherein the respective groups of applications comprise respective groups of SD-WAN applications, and wherein using the generated heat map to identify at least one modification to make to the SD-WAN infrastructure to improve forwarding of the plurality of data message flows comprises:

using the generated heat map to identify a group of SD-WAN applications from among the respective groups of SD-WAN applications;

from the identified group of SD-WAN applications, identifying a particular SD-WAN application associated with a particular metric from the collected plurality of metrics to be improved; and modifying the SD-WAN infrastructure to improve the particular metric for the particular SD-WAN application.

6. The method of claim 5, wherein the particular SD-WAN application comprises one of a VOIP application, a database application, and an application for running virtual machines (VMs).

7. The method of claim 6, wherein the particular metric comprises one of throughput, latency, packet loss, and jitter.

8. The method of claim 5, wherein modifying the SD-WAN infrastructure to improve the particular metric for the particular SD-WAN application comprises modifying one of (i) a number of edge forwarding elements that connect datacenters to each other through the SD-WAN infrastructure, (ii) a number of hubs that connect edge forwarding elements to each other through the SD-WAN infrastructure, and (iii) link capacities of a set of links used to connect to the particular SD-WAN application.

9. The method of claim 1 further comprising presenting the visualization of the geographical area covered by the SD-WAN infrastructure through a user interface (UI), wherein using the generated heat map to identify at least one modification to make to the SD-WAN infrastructure to improve forwarding of the plurality of data message flows comprises implementing a user-specified modification received through the UI.

10. The method of claim 9, wherein the visualization comprises (i) representations of the plurality of data message flows, (ii) representations of the set of MFEs at their respective locations, and (iii) representations of the respective destination clusters at their respective locations.

11. The method of claim 1, wherein the set of MFEs comprises (i) a set of edge routers for connecting datacenters to the SD-WAN infrastructure, (ii) a set of cloud gateway routers for connecting edge routers in the set of edge routers to third-party datacenters through the SD-WAN infrastructure, and (iii) a set of hub routers for connecting each edge router in the set of edge routers to each other edge router in the set of edge routers.

12. A non-transitory machine readable medium storing a program for execution by a set of processing units, the program for using a heat map to modify an SD-WAN (software-defined wide-area network) infrastructure deployed for a set of geographic locations, the program comprising sets of instructions for:

from a set of managed forwarding elements (MFEs) that forward a plurality of data message flows through the SD-WAN infrastructure to a set of destination clusters, collecting a plurality of metrics associated with the plurality of data message flows;

based on the collected plurality of metrics, generating a heat map that accounts for (i) the plurality of data message flows, (ii) locations of respective MFEs from among the set of MFEs, and (iii) locations of respective destination clusters from among the set of destination clusters, wherein the heat map is configured to group destinations of the plurality of data message flows into the set of destination clusters based on geographic proximity of the destinations to each other, the respective destination clusters corresponding to respective groups of applications, and wherein the heat map is configured to provide a visualization of a geographical area covered by the SD-WAN infrastructure, the respective groups of applications being distributed across the heat map; and using the generated heat map to identify at least one modification to make to the SD-WAN infrastructure to improve forwarding of the plurality of data message flows to the respective groups of applications distributed across the heat map.

13. The non-transitory machine readable medium of claim 12, wherein the respective groups of applications comprise respective groups of Saas (software as a service) applications.

14. The non-transitory machine readable medium of claim 12, wherein using the generated heat map to identify at least one modification to make to the SD-WAN infrastructure to improve forwarding of the plurality of data message flows comprises:

identifying from the heat map a particular destination cluster from among the set of destination clusters at a particular location that does not include an MFE for forwarding data message flows to and from the particular destination cluster; and deploying a new MFE to the particular location to improve forwarding to and from the particular destination cluster.

15. The non-transitory machine readable medium of claim 12, wherein using the generated heat map to identify at least one modification to make to the SD-WAN infrastructure to improve forwarding of the plurality of data message flows comprises:

using the heat map to identify one or more locations of one or more destination clusters in the set of destination clusters experiencing congestion; and for each identified location, deploying a new MFE to the location to improve forwarding of the plurality of data message flows.

16. The non-transitory machine readable medium of claim 12, wherein the respective groups of applications comprise respective groups of SD-WAN applications, and wherein using the generated heat map to identify at least one modification to make to the SD-WAN infrastructure to improve forwarding of the plurality of data message flows comprises:

using the generated heat map to identify a group of SD-WAN applications from among the respective groups of SD-WAN applications;

from the identified group of SD-WAN applications, identifying a particular SD-WAN application associated with a particular metric from the collected plurality of metrics to be improved; and modifying the SD-WAN infrastructure to improve the particular metric for the particular SD-WAN application.

17. The non-transitory machine readable medium of claim 16, wherein:

the particular SD-WAN application comprises one of a VOIP application, a database application, and an application for running virtual machines (VMs); and the particular metric comprises one of throughput, latency, packet loss, and jitter.

18. The non-transitory machine readable medium of claim 16, wherein the set of instructions for modifying the SD-WAN infrastructure to improve the particular metric for the particular SD-WAN application comprises a set of instructions for modifying one of (i) a number of edge forwarding elements that connect datacenters to each other through the SD-WAN infrastructure, (ii) a number of hubs that connect edge forwarding elements to each other through the SD-WAN infrastructure, and (iii) link capacities of a set of links used to connect to the particular SD-WAN application.

19. The non-transitory machine readable medium of claim 12, the program further comprising a set of instructions for presenting, through a user interface (UI), the visualization of the geographical area covered by the SD-WAN infrastructure comprising (i) representations of the plurality of data message flows, (ii) representations of the set of MFEs at their respective locations, and (iii) representations of the respective destination clusters at their respective locations, wherein the set of instructions for using the generated heat map to identify at least one modification to make to the SD-WAN infrastructure to improve forwarding of the plurality of data message flows comprises a set of instructions for implementing a user-specified modification received through the UI.

20. The non-transitory machine readable medium of claim 12, wherein the set of MFEs comprises (i) a set of edge routers for connecting datacenters to the SD-WAN infrastructure, (ii) a set of cloud gateway routers for connecting edge routers in the set of edge routers to third-party datacenters through the SD-WAN infrastructure, and (iii) a set of hub routers for connecting each edge router in the set of edge routers to each other edge router in the set of edge routers.

* * * * *